(12) United States Patent
Chu et al.

(10) Patent No.: US 11,502,301 B2
(45) Date of Patent: Nov. 15, 2022

(54) BINDER COMPOSITION FOR AN ELECTRODE AND METHODS FOR PRODUCING THE SAME

(71) Applicant: HERCULES INCORPORATED, Wilmington, DE (US)

(72) Inventors: Sung Gun Chu, Hockessin, DE (US); Alan E Goliaszewski, Hockessin, DE (US)

(73) Assignee: Hercules LLC, Wilmington, DE (US)

( * ) Notice: Subject to any disclaimer, the term of this patent is extended or adjusted under 35 U.S.C. 154(b) by 1225 days.

(21) Appl. No.: 14/283,889

(22) Filed: May 21, 2014

(65) Prior Publication Data

US 2014/0349184 A1 Nov. 27, 2014

Related U.S. Application Data

(60) Provisional application No. 61/826,794, filed on May 23, 2013, provisional application No. 61/840,098, filed on Jun. 27, 2013.

(51) Int. Cl.

| *H01M 4/62* | (2006.01) |
| *C08L 1/28* | (2006.01) |
| *C08L 9/10* | (2006.01) |
| *C08L 25/14* | (2006.01) |
| *C08L 33/00* | (2006.01) |
| *C09J 101/28* | (2006.01) |
| *H01M 4/13* | (2010.01) |
| *H01M 4/139* | (2010.01) |

(52) U.S. Cl.
CPC ............. *H01M 4/622* (2013.01); *C08L 1/286* (2013.01); *C08L 9/10* (2013.01); *C08L 25/14* (2013.01); *C08L 33/00* (2013.01); *C09J 101/28* (2013.01); *C09J 101/284* (2013.01); *C09J 101/286* (2013.01); *H01M 4/13* (2013.01); *H01M 4/139* (2013.01); *C08L 2201/52* (2013.01)

(58) Field of Classification Search
CPC ........ H01M 4/622; H01M 4/13; H01M 4/139; C08L 1/286; C08L 9/10; C08L 25/14; C08L 33/00; C08L 2201/52; C09J 101/28; C09J 101/284; C09J 101/286
USPC ........................................ 429/217
See application file for complete search history.

(56) References Cited

U.S. PATENT DOCUMENTS

| 7,582,382 | B2 | 9/2009 | Bernard et al. |
| 8,057,554 | B2 | 11/2011 | Xu et al. |
| 2004/0258991 | A1 | 12/2004 | Choi et al. |
| 2010/0196759 | A1 | 8/2010 | Nakane et al. |
| 2010/0261051 | A1* | 10/2010 | Okada ............... H01M 4/587 429/188 |
| 2011/0104378 | A1 | 5/2011 | Willimann et al. |
| 2012/0094178 | A1 | 4/2012 | Loveridge et al. |
| 2012/0107688 | A1 | 5/2012 | Loveridge |
| 2012/0176003 | A1 | 7/2012 | Ha et al. |
| 2012/0195159 | A1 | 8/2012 | Kitayoshi |
| 2012/0244437 | A1 | 9/2012 | Han et al. |
| 2012/0288759 | A1 | 11/2012 | Nagai et al. |

FOREIGN PATENT DOCUMENTS

| EP | 1439673 | 6/2004 |
| EP | 1489673 B1 | 12/2004 |
| EP | 2254193 A1 | 11/2010 |
| EP | 2341083 A1 | 7/2011 |

OTHER PUBLICATIONS

International Search Report, PCT/US2014/038978, published on Aug. 1, 2014.

* cited by examiner

*Primary Examiner* — Ling Siu Choi
*Assistant Examiner* — Ronald Grinsted
(74) *Attorney, Agent, or Firm* — William J. Davis; Nathalie Tietcheu

(57) ABSTRACT

The presently disclosed and/or claimed inventive process(es), procedure(s), method(s), product(s), result(s), and/or concept(s) (collectively hereinafter referred to as the "presently disclosed and/or claimed inventive concept(s)") relates generally to the composition of a binder for use in battery electrodes and methods of preparing such. More particularly, but not by way of limitation, the presently disclosed and/or claimed inventive concept(s) relates to a binder composition containing an ionizable water soluble polymer and a redispersible powder containing a latex, a protective colloid, and an anticaking agent for use in the production and manufacture of electrodes of a lithium ion battery. Additionally, the presently disclosed and/or claimed inventive concept(s) relates generally to the compositions and methods of making electrodes, both anodes and cathodes, with a binder composition containing an ionizable water soluble polymer and a redispersible powder.

21 Claims, 16 Drawing Sheets

BINDER COMPOSITION FOR AN ELECTRODE AND METHODS FOR PRODUCING THE SAME

CROSS REFERENCE TO RELATED APPLICATIONS

The present application claims the benefit under 35 U.S.C. 119 (e) of U.S. Provisional Patent Application Ser. No. 61/826,794, filed on May 23, 2013 and U.S. Provisional Patent Application Ser. No. 61/840,098, filed on Jun. 27, 2013, and under 35 U.S.C. the entire contents of which are hereby expressly incorporated herein by reference.

BACKGROUND OF THE INVENTION

1. Field of the Disclosed and Claimed Inventive Concepts

The presently disclosed and/or claimed inventive process(es), procedure(s), method(s), product(s), result(s), and/or concept(s) (collectively hereinafter referred to as the "presently disclosed and/or claimed inventive concept(s)") relates generally to a composition of a binder for use in battery electrodes and methods of preparing such. More particularly, but not by way of limitation, the presently disclosed and/or claimed inventive concept(s) relates to a binder composition comprising an ionizable water soluble polymer and a redispersible powder containing a latex, a protective colloid, and an anticaking agent for use in the production and manufacture of electrodes of a lithium ion battery. Additionally, the presently disclosed and/or claimed inventive concept(s) relates generally to electrode compositions and methods of making electrodes, both anodes and cathodes, with a binder composition containing an ionizable water soluble polymer and a redispersible powder.

2. Background of the Invention

Lithium ion batteries are used in an array of products including medical devices, electric cars, airplanes, and most notably, consumer products such as laptop computers, cell phones, and cameras. Due to their high energy densities, high operating voltages, and low self-discharges, lithium ion batteries have overtaken the secondary battery market and continue to find new uses in developing industries and products.

Generally, lithium ion batteries (LIBs) comprise an anode, a cathode, and an electrolyte material such as an organic solvent containing a lithium salt. More specifically, the anode and cathode (collectively, "electrodes") are formed by mixing either an anode active material or a cathode active material with a binder and a solvent to form a paste or slurry which is then coated and dried on a current collector, such as aluminum or copper, to form a film on the current collector. The anodes and cathodes are then layered and coiled prior to being housed in a pressurized casing containing an electrolyte material, which all together forms a lithium ion battery.

When making electrodes, it is important to select a binder with sufficient adhesive and chemical properties such that the film coated on the current collector will maintain contact with the current collector even when manipulated to fit into the pressurized battery casing. Since the film contains the electrode active material, there will likely be significant interference with the electrochemical properties of the battery if the film does not maintain sufficient contact with the current collector. As such, the binder plays an important role in the performance of lithium ion batteries. Therefore, there is an existing need to not only improve the performance of existing binders but to also provide binders that are easy and fast to produce.

Presently, the binders used in lithium ion batteries generally consist of a cellulosic rheology modifier and a latex material, such as styrene butadiene (SB), which are mixed with an electrode active material and a dispersing agent in a multi-step process. See for example, US 2004/0258991 filed by Choi et al. and its corresponding European application, EP 1489673, both of which are herein incorporated by reference in their entirety. Since cellulosic materials are generally in powder form, they are not easily soluble in water and require a long time to dissolve unless subjected to a high shear at low concentrations of the cellulosic material (e.g., less than 3%). However, styrene butadiene latex is not stable at a high shear (and high temperature) and, therefore, cannot be mixed together with both the cellulosic material(s) and the electrode active material(s) in a single mixing step. Thus, the use of a latex material in the process typically requires the cellulosic material and the electrode active material to be separately mixed with water to first form individual solutions, which are then mixed together prior to adding the latex material. As such, the number of steps required to produce binders containing a latex material increases the overall cost and time needed to produce lithium ion battery electrodes. Furthermore, styrene butadiene latex (~40-60% water) is not stable at room temperature and requires biocide(s) to store it for longer periods of time. Thus, it is inconvenient to store and ship styrene butadiene latex for the multi-step process, especially during the winter months when temperatures frequently are below room temperature (i.e., below 25° C.).

Given that the prior art methods require multi-stage, time intensive steps that can greatly add to the expense of making slurries necessary for the production of lithium ion battery electrodes, there remains an industrial need for a powdered cobinder that can be mixed with a cellulosic powder and powdered electrode active material(s) in a single step process that is easier and more cost effective for producing slurries. This need can be satisfied, for example but not by way of limitation, by using a redispersible powder instead of an individual latex in the binder composition. Redispersible powders are well-developed in the art. For example, US 2011/0104378 filed by Willimann et al. and herein incorporated by reference in its entirety, describes a redispersible powder useful for building material compositions.

Additionally, current lithium ion battery technology teaches the use of carboxymethylcellulose, carboxyethylcellulose, aminoethylcellulose, and/or oxyethylcellulose as the cellulosic material, wherein carboxymethylcellulose (CMC) has become the preferred choice of cellulose material to be included in LIB binders containing graphite as the anode active material. See, for example, US 2004/0258991 filed by Young-Min Choi et al. and herein incorporated by reference in its entirety. However, as alternative cathode and anode active materials change and evolve, a need for improved binders will arise, for example, to prevent large capacity fades during cycling.

Specifically, silicon has recently come to the forefront as a promising anode active material for LIBs. See, for example, *On the Binding Mechanism of CMC in Si Negative Electrodes for Li-Ion Batteries*, Electrochemistry Communications, vol. 9, 2801-2806 (2007), B. Lestriez, S. Bahri, I. Sandu, L. Roue, D. Guyomard, which is hereby incorporated by reference in its entirety. However, silicon has been known to undergo large volume changes during charging and discharging, which can cause problems for a battery's capacity and overall performance. However, the presently disclosed and/or claimed redispersible powder based binder composition comprising carboxymethyl hydroxyethyl cellulose actually improves the capacity of lithium ion batteries comprising silicon despite the tendency of silicon to cause large volume changes during charging. This is due in part to the higher percent elongation and flexibility of carboxymethyl hydroxyethyl cellulose relative to other celluloses presently used in binder compositions, including CMC. Furthermore, the redispersible powder based binder composition disclosed herein comprising carboxymethyl hydroxyethyl cellulose is capable of being used in both anodes and cathodes, which demonstrate improved electrochemical properties over the prior art.

SUMMARY OF THE INVENTIVE CONCEPTS

The presently disclosed and/or claimed inventive concept(s) encompasses a binder material that can be in the form of a dry powder capable of reducing the mixing efforts necessary to form a slurry for the production of lithium ion battery electrodes. The presently disclosed and/or claimed inventive concept(s) further encompasses a binder precursor composition(s) for use in the preparation of a lithium ion battery comprising an ionizable water soluble polymer and a redispersible powder comprising a protective colloid, an anticaking agent, and a latex polymer. In one embodiment, the ionizable water soluble polymer can be a hydrophilically modified cellulosic material, for example, but without limitation, carboxyalkyl cellulose and carboxymethyl hydroxyethyl cellulose. It is contemplated that a slurry can be formed by adding water to the above-described binder precursor composition.

The presently disclosed and/or claimed inventive concept(s) also encompasses an electrode for use in a lithium ion battery comprising (i) a film comprising: (1) an electrode active material, and (2) a binder comprising an ionizable water soluble polymer and a redispersible powder; and (ii) a current collector. In one embodiment, the ionizable water soluble polymer can be a hydrophilically modified cellulose, for example, but without limitation, carboxyalkyl cellulose and carboxymethyl hydroxyethyl cellulose.

Additionally, the presently disclosed and/or claimed inventive concept(s) also encompasses a method of making an electrode for a lithium ion battery comprising the steps of (1) combining an electrode active material, an ionizable water soluble polymer, a redispersible powder, and water to form a slurry; (2) applying the slurry to a current collector to form a coated current collector comprising a slurry layer on the current collector; and (3) drying the slurry layer on the coated current collector to form a film on the current collector, wherein the film and the current collector comprise the electrode. In one embodiment, the ionizable water soluble polymer can be a hydrophilically modified cellulose, for example, but without limitation, carboxyalkyl cellulose and carboxymethyl hydroxyethyl cellulose.

DETAILED DESCRIPTION OF THE INVENTIVE CONCEPT(S)

Figure 1:
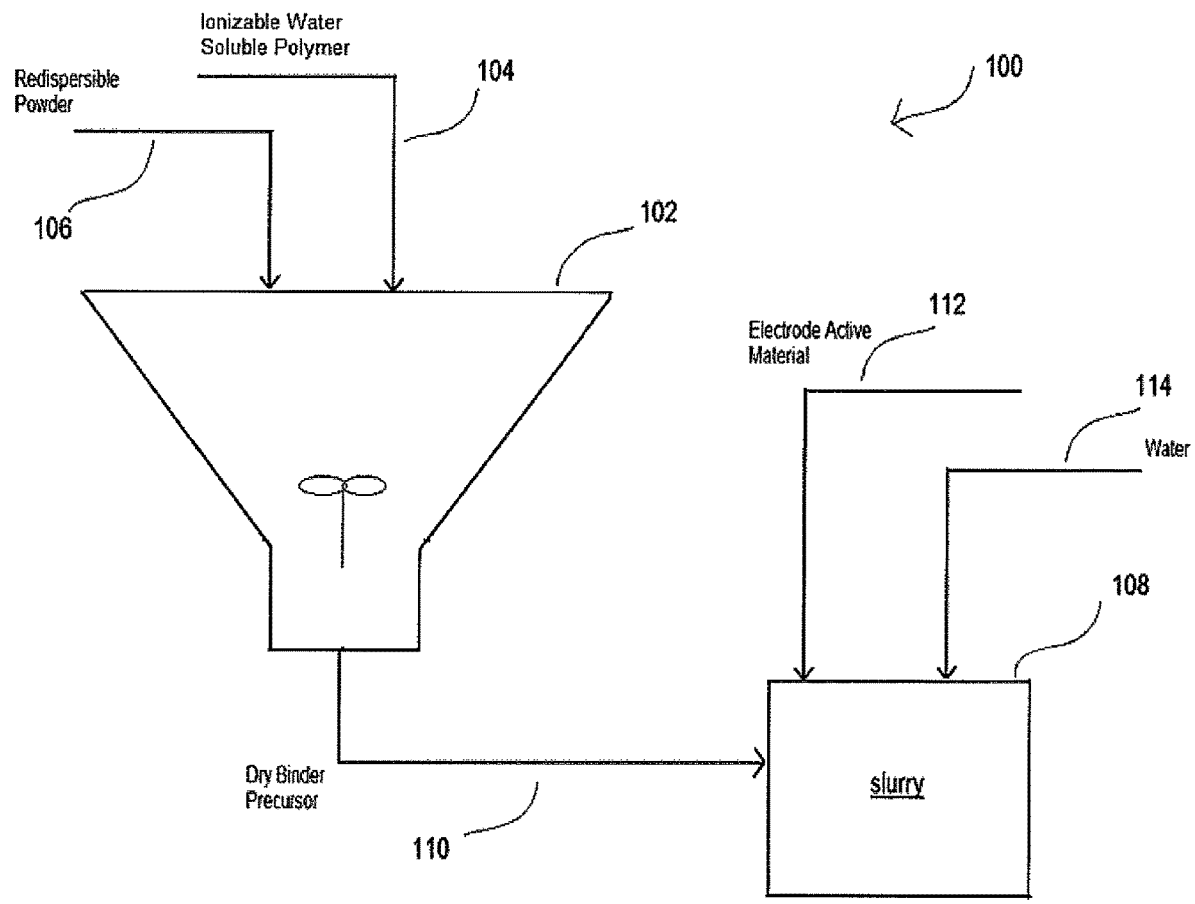
FIG. 1 is a schematic diagram, in accordance with one embodiment, for a method of making a slurry for use in the manufacture of an electrode.

Before explaining at least one embodiment of the presently disclosed and/or claimed inventive concept(s) in detail, it is to be understood that the presently disclosed and/or claimed inventive concept(s) is not limited in its application to the details of construction and the arrangement of the components or steps or methodologies set forth in the following description or illustrated in the drawings. The presently disclosed and/or claimed inventive concept(s) is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the presently disclosed and/or claimed inventive concept(s) shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the presently disclosed and/or claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the presently disclosed and/or claimed inventive concept(s) have been described in terms of preferred embodiments, it will be apparent to those of ordinary skill in the art that variations may be applied to the articles and/or methods and in the steps or in the sequence of steps of the method described herein without departing from the concept, spirit and scope of the presently disclosed and/or claimed inventive concept(s). All such similar substitutes and modifications apparent to those skilled in the art are deemed to be within the spirit, scope and concept of the presently disclosed and/or claimed inventive concept(s).

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "or combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

A binder precursor composition of the presently disclosed and/or claimed inventive concept(s) generally comprises, consists of, or consists essentially of an ionizable water soluble polymer and a redispersible powder which can comprise, consist of, or consist essentially of a protective colloid (also referred to as a "redispersing aid"), an anticaking agent, and a latex polymer. The ionizable water soluble polymer can be any material selected from the group comprising, consisting of, or consisting essentially of a hydrophilically modified cellulose material, a polyacrylic acid, a polyacrylic acid copolymer, and combinations thereof. The binder precursor composition can generally be used in the manufacture of a film for use in the production of an electrode for a lithium ion battery.

In one non-limiting embodiment, the hydrophilically modified cellulosic material can be a carboxyalkyl cellulose. In particular, but without limitation, the hydrophilically modified cellulosic material can be carboxymethyl cellulose. The degree of substitution of the hydrophilically modified cellulosic material employed in the compositions and methods of the presently disclosed and/or claimed inventive concept(s) can be in a range of from about 0.6 to 1.4, or from about 0.7 to about 1.2, or from about 0.8 to about 1.1.

In another non-limiting embodiment, the hydrophilically modified cellulosic material can be a hydrophilically modified hydroxyalkyl cellulose. The hydrophilically modified hydroxyalkyl cellulose can be any hydroxyalkyl cellulose modified with a hydrophilic group. For example, but without limitation, the hydroxyalkyl cellulose can be selected from the group comprising, consisting of, or consisting essentially of hydroxyethyl cellulose, hydroxypropyl cellulose, and combinations thereof. Additionally, for example, but without limitation, the hydrophilic group can be a carboxyalkyl group. In a further non-limiting embodiment, the hydrophilically modified hydroxyalkyl cellulose can be selected from the group comprising, consisting of, or consisting essentially of carboxymethyl hydroxyethyl cellulose, carboxymethyl hydroxypropyl cellulose, and combinations thereof.

The polyacrylic acid copolymer can be a polymer comprising polyacrylic acid and at least one of the following monomers selected from the group comprising, consisting of, or consisting essentially of methacrylic acid, acrylamide, sulfonic acids, and combinations thereof. In a further non-limiting embodiment, the sulfonic acids are selected from the group comprising, consisting of, or consisting essentially of 2-acrylamido-2-methylpropane sulfonic acid (AMPS®, The Lubrizol Corporation, Wickliffe, Ohio) and vinyl sulfonic acid.

The protective colloid in the redispersible powder can be selected from the group comprising, consisting of, or consisting essentially of polyvinyl alcohol, polyvinyl acetate, a hydroxyalkyl cellulose polymer, and combinations thereof. In a further non-limiting embodiment, the hydroxyalkyl cellulose polymer can be hydroxyethyl cellulose.

The anticaking agent in the redispersible powder can be any material selected from the group comprising, consisting of, or consisting essentially of calcium carbonate, kaolin, silica, carbon, lithium carbonate, and combinations thereof.

The latex polymer in the redispersible powder can be any material selected from the group comprising, consisting of, or consisting essentially of styrene butadiene, vinyl acetate ethylene, styrene acrylic, vinyl acrylic, ethylene vinylversatate, and combinations thereof. It is also contemplated that the latex polymer in the presently disclosed and/or claimed inventive concept can be any polymer effective in a slurry such that it is capable of forming a film on a current collector with reasonable adhesive and electrochemical properties.

In one embodiment, the ionizable water soluble polymer can be present in the binder precursor composition in a range of from about 2% to about 75%, or from about 20% to about 60%, or from about 35% to about 45% by weight. The redispersible powder can be present in the binder precursor composition in a range of from about 25% to about 98%, or from about 40% to about 80%, or from about 55% to about 65% by weight.

Additionally, in one embodiment, the protective colloid can be present in the redispersible powder in a range of from about 0.1% to about 10%, or from about 2% to about 8%, or from about 4% to about 6% by weight; the anticaking agent can be present in the redispersible powder in a range of from about 1% to about 35%, or from about 10% to about 30%, or from about 25% to about 35% by weight; and the latex polymer can be present in the redispersible powder in a range of from about 30% to about 98.9%, or from about 65% to about 90%, or from about 70% to about 85% by weight.

The redispersible powder can be in the form of particles, wherein the average diameter of the redispersible powder particles is less than about 500 μm, or less than about 300 μm, or less than about 150 μm.

In an alternative embodiment, the binder precursor composition of the presently disclosed and/or claimed inventive concept(s) comprises, consists of, or consists essentially of an electrode active material, an ionizable water soluble polymer, and a redispersible powder which can comprise, consist of, or consist essentially of a protective colloid, an anticaking agent, and a latex polymer. The ionizable water soluble polymer can be present in the binder precursor composition in a range from about 0.25% to about 2.25%, or from about 0.5% to about 1.75%, or from about 0.75% to about 1.25% by weight; the redispersible powder can be present in the binder precursor composition in a range from about 0.25% to about 3.5%, or from about 0.75% to about 2.5%, or from about 1.25% to about 1.75% by weight; and the electrode active material can be present in the binder precursor composition in a range from about 94.25% to about 99.5%, or from about 95% to about 99%, or from about 96.5% to about 98.5% by weight.

In one embodiment, the electrode active material is an anode active material. The anode active material can be any material comprising, consisting of, or consisting essentially of (1) carbonaceous materials, (2) silicon-based alloys, (3) complex compounds comprising, consisting of, or consisting essentially of: i) a carbonaceous material(s) and ii) a metal(s) comprising, consisting of, or consisting essentially of Al, Ag, Bi, In, Ge, Mg, Pb, Si, Sn, Ti, and combinations thereof, (4) a lithium complex metal oxide, (5) lithium-containing nitrides, and (6) combinations thereof. The anode active material, in one non-limiting embodiment, can be a carbonaceous material wherein the material comprises, consists of, or consists essentially of an artificial graphite, a natural graphite, surface modified graphite, coke, carbon fiber, and combinations thereof. In another non-limiting embodiment, the anode active material can be a complex compound comprising, consisting of, or consisting essentially of a carbonaceous material and silicon. The anode active material, in another non-limiting embodiment, can comprise, consist of, or consist essentially of lithium titanate oxide (LTO).

In another embodiment, the electrode active material is a cathode active material. The cathode active material can be any material comprising, consisting of, or consisting essentially of lithium-containing transition metal oxides. The cathode active material, in one non-limiting embodiment, can be selected from the group consisting of lithium iron phosphate ($LiFePO_4$), lithium cobalt oxide ($LiCoO_2$), lithium nickel oxide ($LiNiO_2$), lithium nickel cobalt aluminum oxide ($LiNiCoAlO_2$), lithium nickel manganese cobalt oxide ($LiNiMnCoO_2$), lithium titanate ($Li_4Ti_5O_{12}$), lithium manganese oxide ($LiMn_2O_4$), and combinations thereof.

The presently disclosed and/or claimed invention also encompasses a slurry composition comprising, consisting of, or consisting essentially of the above-described binder precursor compositions in water, wherein in one non-limiting embodiment, the binder precursor composition comprises, consists of, or consists essentially of an ionizable water soluble polymer, a redispersible powder, and an electrode active material, wherein the ionizable water soluble polymer can be present in the binder precursor composition in a range from about 0.25% to about 2.25%, or from about 0.5% to about 1.75%, or from about 0.75% to about 1.25% by dry weight basis; the redispersible powder can be present in the binder precursor composition in a range from about 0.25% to about 3.5%, or from about 0.75% to about 2.5%, or from about 1.25% to about 1.75% by dry weight basis, and the electrode active material can be present in the binder precursor composition in a range from about 94.25% to about 99.5%, or from about 95% to about 99%, or from about 96.5% to about 98.5% by dry weight basis. In another non-limiting embodiment, the slurry comprises, consists of, or consists essentially of the above-identified binder precursor composition(s) in water, wherein the ionizable water soluble polymer can be present in the slurry in a range of from about 0.25% to about 2.25%, or from about 0.5% to about 1.75%, or from about 0.75% to about 1.25% by dry weight basis; the protective colloid is present in the slurry in a range of from about 0.05% to about 0.2%, or from about 0.1% to about 0.19%, or from about 0.165% to about 0.185% by dry weight basis; the anticaking agent is present in the slurry in a range of from about 0.1% to about 0.5%, or from about 0.2% to about 0.4%, or from about 0.25% to about 0.35% by dry weight basis; the latex polymer is present in the slurry in a range of from about 0.5% to about 4%, or from about 1% to about 3%, or from about 1.5% to about 2.5% by dry weight basis; and the electrode active material is present in the slurry in a range of from about 94.25% to about 99.5%, or from about 95% to about 99%, or from about 96.5% to about 98.5% by dry weight basis.

In one embodiment, the above-described slurry has a Brookfield viscosity in a range of from about 1,000 cps to about 15,000 cps, or from about 4000 cps to about 11,000 cps, or from about 5500 cps to about 8500 cps at a shear rate in a range of from about $10s^{-1}$ to about $40s^{-1}$ at 25° C.

Additionally, the presently disclosed and/or claimed inventive concept(s) encompasses an electrode comprising, consisting of, or consisting essentially of (i) a film comprising, consisting of, or consisting essentially of (1) an electrode active material as described above, and (2) a binder precursor composition as described above, and (ii) a current collector. In one embodiment, the ionizable water soluble polymer is present in the film in a range of from about 0.25% to about 2.25%, or from about 0.5% to about 1.75%, or from about 0.75% to about 1.25% by weight, the protective colloid is present in the slurry in a range of from about 0.05% to about 0.2%, or from about 0.1% to about 0.19%, or from about 0.165% to about 0.185% by weight, the anticaking agent is present in the slurry in a range of from about 0.1% to about 0.5%, or from about 0.2% to about 0.4%, or from about 0.25% to about 0.35% by weight, the latex polymer is present in the slurry in a range of from about 0.5% to about 4%, or from about 1% to about 3%, or from about 1.5% to about 2.5% by weight, and the electrode active material is present in the slurry in a range of from about 94.25% to about 99.5%, or from about 95% to about 99%, or from about 96.5% to about 98.5% by weight.

The film has a thickness in a range of from about 30 μm to about 150 μm, or from about 40 μm to about 130 μm, or from about 50 μm to about 100 μm.

The current collector can be any material that acts as an electrical conductor for either the anode active material or the cathode active material. For example, but without limitation, the current collector can be selected from the group of materials comprising, consisting of, or consisting essentially of aluminum, copper, stainless steel, nickel, zinc, silver, and combinations thereof. In one non-limiting embodiment, the current collector for the anode is a copper foil. In another non-limiting embodiment, the current collector for the cathode is an aluminum foil.

The above-described film can be bound to a surface of the above-described current collector to form a bond. In one embodiment, the adhesive strength of the bond is at least about 0.3 gf/mm, or at least about 0.6 gf/mm, or at least about 1.0 gf/mm as determined by the 90 Degree Peel Adhesion Test, which will be described below.

The presently disclosed and/or claimed invention also encompasses a method(s) for making the electrode(s) described above comprising, consisting of, or consisting essentially of: (i) combining an electrode active material as described above, an ionizable water soluble polymer as described above, a redispersible powder as described above, and water to form the slurry; (ii) applying the above-described slurry to a current collector as described above to form a coated current collector comprising a slurry layer on the current collector; and (iii) drying the slurry layer on the coated current collector to form a film on the current collector, wherein the above-described film and the current collector comprise the electrode. In one non-limiting embodiment, the ionizable water soluble polymer is a hydrophilically modified hydroxyalkyl cellulose as described above, FIG. 1 is a schematic diagram of one embodiment of a method/system 100 of making a slurry for use in the manufacture of an electrode. With reference to FIG. 1, the ionizable water soluble polymer is delivered to a vessel 102 via conduit 104 and the redispersible powder is delivered to the vessel 102 via conduit 106, wherein the ionizable water soluble polymer and the redispersible powder are dry admixed to form a dry binder precursor composition. The dry binder precursor composition is delivered to a vessel 108 via conduit 110, the electrode active material is delivered to vessel 108 via conduit 112, and the water is delivered to vessel 108 via conduit 114, wherein the ionizable water soluble polymer, the redispersible powder, the electrode active material, and the water are mixed to form the slurry.

Figure 2:
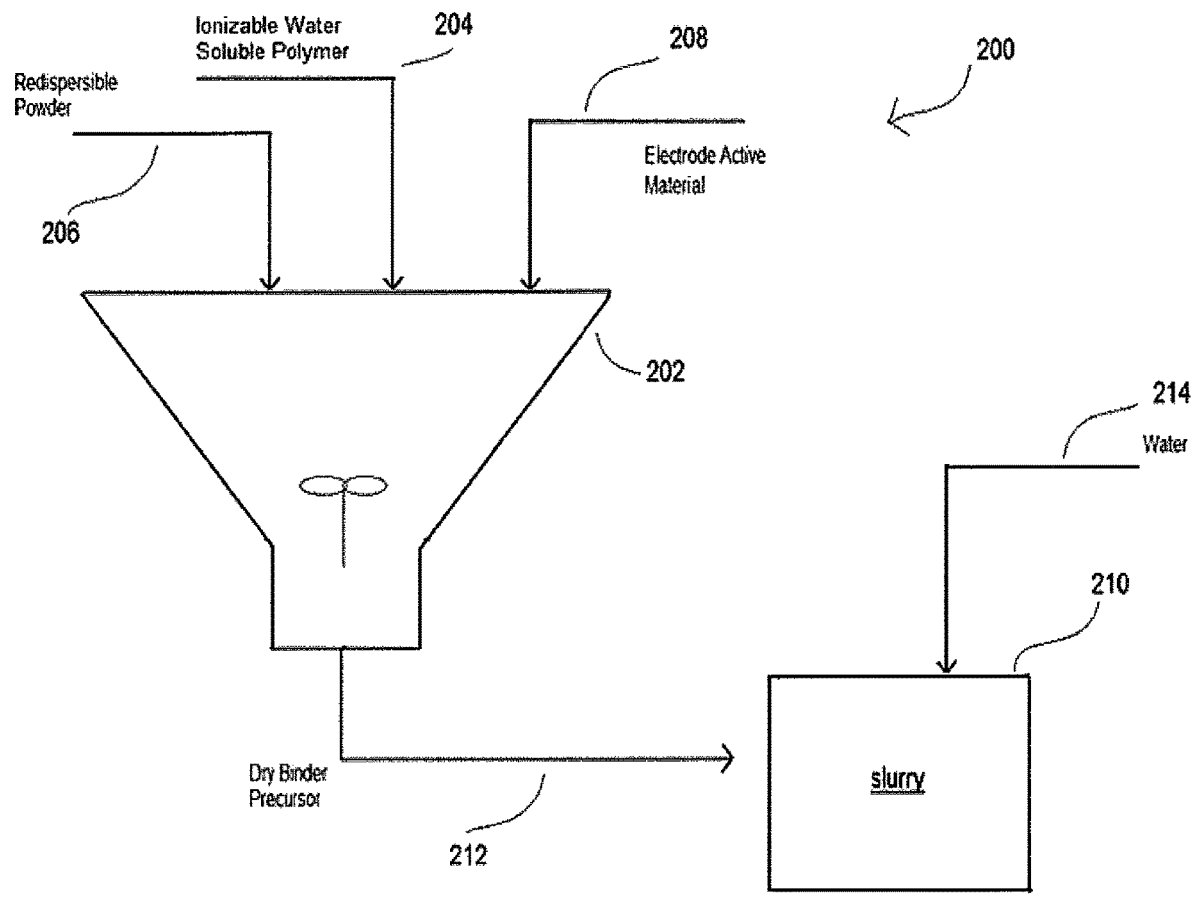
FIG. 2 is a schematic diagram, in accordance with another embodiment, for a method of making a slurry for use in the manufacture of an electrode.

FIG. 2 is a schematic diagram of an alternative embodiment of a method/system 200 of making a slurry for use in the manufacture of an electrode. With reference to FIG. 2, the ionizable water soluble polymer is delivered to a vessel 202 via conduit 204, the redispersible powder is delivered to the vessel 202 via conduit 206, and the electrode active material is delivered to vessel 202 via conduit 208, wherein the ionizable water soluble polymer, redispersible powder, and electrode active material are dry admixed to form a dry binder precursor composition. The dry binder precursor composition is delivered to a vessel 210 via conduit 212 and the water is delivered to vessel 210 via conduit 214, wherein the ionizable water soluble polymer, the redispersible powder, the electrode active material, and the water are mixed to form the slurry.

Figure 3:
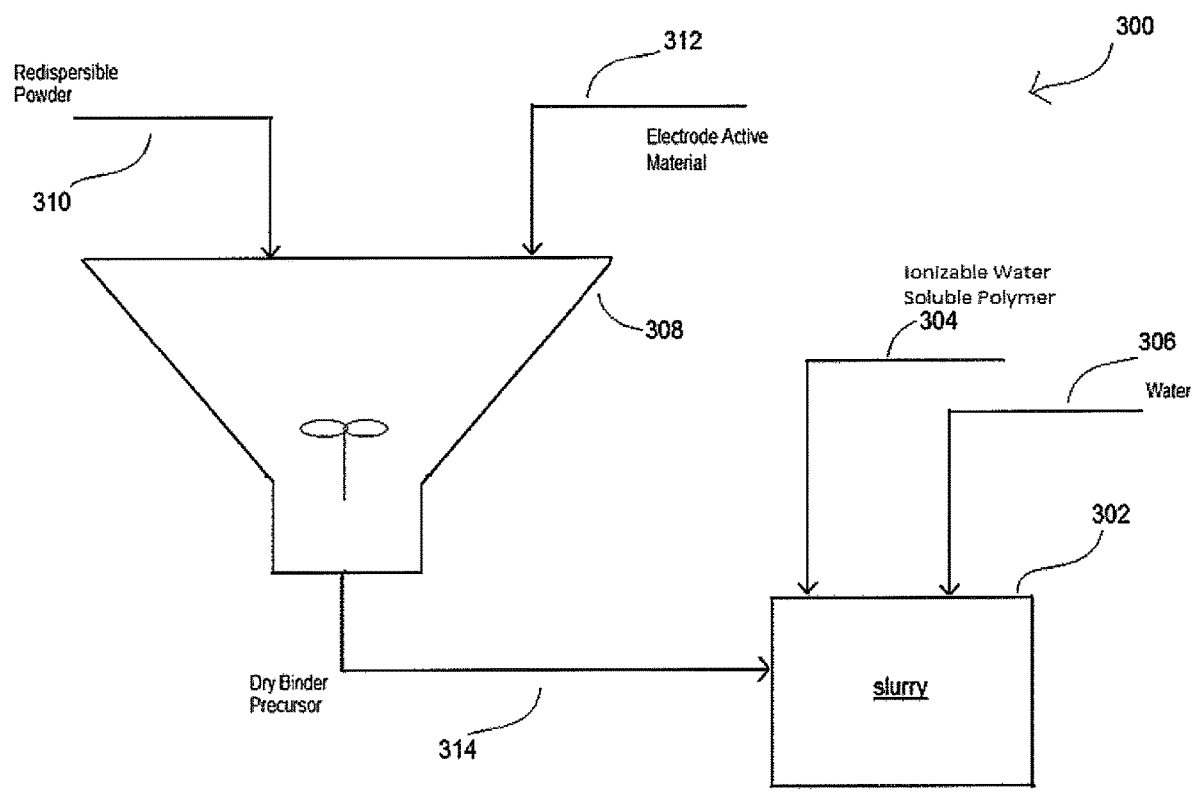
FIG. 3 is a schematic diagram, in accordance with an additional embodiment, for a method of making a slurry for use in the manufacture of an electrode.

FIG. 3 is a schematic diagram of an additional alternative embodiment of a method/system 300 of making a slurry for use in the manufacture of an electrode. With reference to FIG. 3, the ionizable water soluble polymer is first delivered to a vessel 302 via conduit 304 along with water which is delivered to the vessel 302 via conduit 306 to form an aqueous solution. The redispersible powder is delivered to vessel 308 via conduit 310 and the electrode active material is added to vessel 308 via conduit 312, wherein the redispersible powder and electrode active material are dry admixed and thereafter added to vessel 302 via conduit 314 for mixture with the ionizable water soluble polymer and water in vessel 302 to form the slurry.

Additionally, it is contemplated that the ionizable water soluble polymer, electrode active material, and redispersible powder can all be pre-mixed or pre-mixed in various combinations and added to water at the same time or individually.

As described above and shown experimentally below, the use of redispersible powders in the binder materials for lithium ion batteries can reduce the mixing efforts necessary to form a slurry for the production of lithium ion batteries, and actually leads to better electrochemical performances of the lithium ion batteries. In one embodiment, the above-described electrodes have a capacity retention at a C-Rate of 0.05 C and 25° C. for 50 cycles which is greater than about 80%, or greater than about 90%, or greater than about 96%, wherein the film thickness is in the range from about 30 μm to about 100 μm, or from about 35 μm to about 95 μm, or from about 65 μm to about 75 μm. In an another non-limiting embodiment, the capacity retention of the above-described electrodes have a capacity retention at a C-Rate of 0.05 C and 25° C. for 100 cycles which is greater than about 60%, or greater than about 80%, or greater than about 92%, wherein the film thickness is in the range from about 30 μm to about 100 μm, or from about 35 μm to about 90 μm, or from about 65 μm to about 75 μm.

In an additional embodiment the above-described electrodes have an impedance less than about 300 $R_{ct}$, or less than about 250 $R_{ct}$, or less than about 200 $R_{ct}$, wherein the film thickness is less than about 70 μm, or less than about 60 μm, or less than about 35 μm.

EXAMPLES

Graphite Slurry Preparations for Viscosity and Adhesion Tests

Graphite slurries are prepared using two different formulations: a "wet" process and a "dry" process.

The "wet" process for preparing graphite slurries comprises: 1) preparing a solution by adding either a carboxymethyl hydroxyethyl cellulose or a hydroxyethyl cellulose in water and then mixing for an amount of time using an overhead mixer; 2) dispersing graphite powder in water; 3) adding the carboxymethyl hydroxyethyl cellulose or hydroxyethyl cellulose to the graphite dispersion and then mixing for an amount of time with the overhead mixer; 4) adding either a latex emulsion (hereinafter "latex") or a redispersible powder to the slurry comprising graphite and either carboxymethyl hydroxyethyl cellulose or hydroxyethyl cellulose, and then mixing with an overhead mixer for an amount of time.

The "wet" process for preparing slurries containing a carboxymethyl cellulose comprised: 1) preparing a carboxymethyl cellulose solution in water at 25° C. with an overhead mechanical mixer; 2) dispersing graphite powder in water in a 150 mL container; 3) adding the carboxymethyl cellulose solution to the graphite dispersion and then mixing for one hour with an overhead mixer; and 4) adding either a latex emulsion or a redispersible powder to the graphite/carboxymethyl cellulose slurry and thereafter mixing with an overhead mixer for 10 minutes.

The "dry" process for preparing graphite slurries comprises: 1) dispersing an amount of a blend of graphite powder and either a carboxymethyl hydroxyethyl cellulose powder or a hydroxyethyl cellulose powder in water and mixing for an amount of time using an overhead mixer, and 2) adding either a latex or a redispersible powder to the graphite/cellulose slurry and thereafter mixing with an overhead mixer for an amount of time.

The "dry" process for preparing slurries containing a carboxymethyl cellulose comprised: 1) dispersing a carboxymethyl cellulose powder and graphite powder blend in water in a 150 mL container and mixing for one hour with an overhead mixer, and 2) adding either a latex emulsion (hereinafter "latex") or a redispersible powder to the graphite/carboxymethyl cellulose slurry and thereafter mixing with an overhead mixer for 10 minutes.

The slurries were prepared using several different formulations. For each formulation, the total amount of solids (i.e., graphite, carboxymethyl cellulose, and latex or redispersible powder) was approximately 47% by weight with the remaining 53% by weight comprising water. As illustrated in the tables below, the amount, ratio, and type of graphite, carboxymethyl cellulose, and latex or redispersible powder varied throughout the examples; however, for those examples comprising redispersible powder instead of a latex, the redispersible powder was comprised of 75% by weight latex particles, 20% by weight anticaking agent, and 5% by weight protective colloid, wherein the anticaking agent was calcium carbonate ($CaCO_3$) and lithium carbonate, the protective colloid (or "redispersing aid") was polyvinyl alcohol (PVOH), and the latex particles varied depending on the redispersible powder as suggested in the tables below.

Table 1 presents a detailed description of a slurry composition prepared by the "wet" process having a total solids (i.e., graphite, carboxymethyl cellulose, and latex or redispersible powder) amount of approximately 47% by weight, wherein the normalized ratio of graphite, carboxymethyl cellulose (CMC), and redispersible powder (RDP) or latex is 100/1/1.5. Although not shown in Table 1, a slurry composition prepared by the "dry" process can be calculated from a normalized ratio of graphite, CMC, and RDP or latex taking into consideration that the CMC was mixed with the graphite prior to adding water to form an aqueous solution.

TABLE 1

| Components | Weight (g) | Weight % of Total Slurry Composition | Normalized Ratio of Solids |
|---|---|---|---|
| Graphite | 90 | 45.852 | 100 |
| Water | 46.2857 | 23.6 | — |
| Solution Containing: | Water: 57.75 | 29.4 | — |
| Carboxymethyl cellulose (CMC) | CMC: 0.90 | 0.459 | 1 |
| (1.5 wt % in solution) and RDP or Latex (2.25 wt % in solution) | RDP or Latex: 1.35 | 0.688 | 1.5 |

Although not shown in Table 1, several of the following examples illustrate that the amount of RDP or latex (or CMC) can be increased such that the normalized ratio of graphite, carboxymethyl cellulose, and RDP or latex are adjusted to reflect the increase. For example, the ratios 100/1/2, 100/1/2.5, and 100/1/3 are illustrated below. Thus, the weight percent of each component, i.e., graphite, water, CMC, and either the RDP or the latex, can quickly be determined from the normalized ratio of solids in light of Table 1. As such, the specific amounts of the components for each ratio are not expressly identified, as was previously done above. However, the following examples explicitly identify the ratio of CMC to RDP (or latex) keeping in mind that each ratio is normalized with respect to the amount of graphite in the composition.

Silicon Slurry Preparations for Viscosity and Adhesion Tests

Silicon slurries are prepared using a "wet" process and a "dry" process.

The "wet" process for preparing silicon slurries comprises: 1) preparing a solution by adding a carboxymethyl hydroxyethyl cellulose, a carboxymethylcellulose or a hydroxyethyl cellulose in water and then mixing for an amount of time using an overhead mixer; 2) dispersing a powder of a silicon containing compound in water; 3) adding the carboxymethyl hydroxyethyl cellulose, carboxymethylcellulose or hydroxyethyl cellulose to the dispersion of the silicon containing compound and then mixing for an amount of time with the overhead mixer; 4) adding either a latex or a redispersible powder to the slurry comprising the silicon containing compound and carboxymethyl hydroxyethyl cellulose, carboxymethylcellulose or hydroxyethyl cellulose, and then mixing with an overhead mixer for an amount of time.

The "dry" process for preparing silicon slurries comprises: 1) dispersing an amount of a blend of powder comprising a silicon containing compound, and a carboxymethyl hydroxyethyl cellulose powder, a carboxymethylcellulose powder or a hydroxyethyl cellulose powder in water and mixing for an amount of time using an overhead mixer, and 2) adding either a latex or a redispersible powder to the silicon containing compound/cellulose slurry and thereafter mixing with an overhead mixer for an amount of time.

Graphite/Silicon Slurry Preparations for Viscosity and Adhesion Tests

Graphite/Silicon slurries are prepared using two different formulations: a "wet" process and a "dry" process.

The "wet" process for preparing graphite/silicon slurries comprises: 1) preparing a solution by adding either a carboxymethyl hydroxyethyl cellulose or a hydroxyethyl cellulose in water and then mixing for an amount of time using an overhead mixer; 2) dispersing graphite powder and powder of a silicon containing compound in water; 3) adding the carboxymethyl hydroxyethyl cellulose or hydroxyethyl cellulose to the graphite/silicon dispersion and then mixing for an amount of time with the overhead mixer; 4) adding either a latex emulsion (hereinafter "latex") or a redispersible powder to the slurry comprising graphite, the silicon containing compound, and either carboxymethyl hydroxyethyl cellulose or hydroxyethyl cellulose, and then mixing with an overhead mixer for an amount of time.

The "wet" process for preparing graphite/silicon slurries containing a carboxymethyl cellulose comprised: 1) preparing a carboxymethyl cellulose solution in water at 25° C. with an overhead mechanical mixer; 2) dispersing graphite powder and $SiO_x$ powder in water in a 150 mL container; 3) adding the carboxymethyl cellulose solution to the graphite and $SiO_x$ dispersion and then mixing for one hour with an overhead mixer; and 4) adding either a latex emulsion or a redispersible powder to the graphite/$SiO_x$/carboxymethyl cellulose slurry and thereafter mixing with an overhead mixer for 10 minutes.

The "dry" process for preparing graphite/silicon slurries will comprise: 1) dispersing an amount of a blend of graphite powder, powder of a silicon containing compound, and either a carboxymethyl hydroxyethyl cellulose powder or a hydroxyethyl cellulose powder in water and mixing for an amount of time using an overhead mixer; and 2) adding either a latex or a redispersible powder to the graphite/silicon/cellulose slurry and thereafter mixing with an overhead mixer for an amount of time.

The "dry" process for preparing slurries containing a carboxymethyl cellulose comprised: 1) dispersing a carboxymethyl cellulose powder and graphite powder/$SiO_x$ blend in water in a 150 mL container and mixing for one hour with an overhead mixer, and 2) adding either a latex emulsion (hereinafter "latex") or a redispersible powder to the graphite/$SiO_x$/carboxymethyl cellulose slurry and thereafter mixing with an overhead mixer for 10 minutes.

Preparation of Select Redispersible Powders

Two redispersible powders were prepared specifically for the following examples and are distinguished as RDP-1 and RDP-2. The following describes the components and methods of preparation for both redispersible powders.

RDP-1 was prepared by the following: 1) an amount of vinylacetate ethylene (VAE) copolymer latex having a Tg of +10° C. (Celvolit® 1328 from Celanese Co., Houston, Tex.) was added to an aqueous solution comprising 20 wt % of a redispersing agent (Celvol® 504 from Celanese Co., Houston, Tex.) such as to form a liquid feed stock, wherein 45 wt % of the feedstock was comprised of the VAE latex and redispersing agent; 2) Separately, Calcium carbonate ($CaCO_3$) having a small particle size (e.g. <2 µm) was blended with a clay having a particle size <1 µm in a weight ratio of 3:1 to form an anticaking agent; and 3) the liquid feed stock and the blended anticaking agent were co-fed to an SD-200-R-AB Spray Dryer from GEA Niro (Copenhagen, Denmark), wherein the liquid feed stock was fed at a temperature between 50-55° C. and the sprayer outlet temperature was between 110-120° C. The redispersible powder produced by the process, RDP-1, had a bulk density between 0.4-0.5 g/cm$^3$, a particle size between 80-120 µm, a moisture content <1 wt %, and ash contents between 5-20 wt %.

RDP-2 was prepared by the following: 1) an amount of vinylacetate ethylene (VAE) copolymer latex having a Tg of −10° C. (Celvolit® 1388 from Celanese Co., Houston, Tex.) was added to an aqueous solution comprising 20 wt % of a redispersing agent (Celvol® 504 from Celanese Co., Houston, Tex.) such as to form a liquid feed stock, wherein 45 wt % of the feedstock was comprised of the VAE latex and redispersing agent; 2) Separately, Calcium carbonate ($CaCO_3$) having a small particle size (e.g. <2 µm) was blended with a clay having a particle size <1 µm in a weight ratio of 3:1 to form an anticaking agent; and 3) the liquid feed stock and the blended anticaking agent were co-fed to an SD-200-R-AB Spray Dryer from GEA Niro (Copenhagen, Denmark), wherein the liquid feed stock was fed at a temperature between 50-55° C. and the sprayer outlet temperature was between 110-120° C. The redispersible powder produced by the process, RDP-2, had a bulk density between 0.4-0.5 g/cm$^3$, a particle size between 80-120 µm, a moisture content <1 wt %, and ash contents between 5-20 wt %.

Test Methods

Slurry Stability Measurements

The stability of select silicon slurry samples are measured by placing the slurries in capped cylindrical glass bottles which are then stored at room temperature for a week. Specifically, select slurry samples are placed in approximately 50 mL glass bottles for around 7 days during which the samples are monitored for phase separation phenomena every day. It is predicted that the unstable slurry samples separate such that the water or low viscosity solution form a top layer and the graphite or silicon solution form a bottom layer in the glass bottles. The slurries are determined to be stable if they stay in solution for around 5 or more days.

Graphite slurry or Graphite/Silicon slurry stabilities was measured for select slurry samples by placing the slurries in capped cylindrical glass bottles which were then stored at room temperature for a week. Specifically, 30 g of the graphite slurry or the graphite/silicon slurry samples were placed in 50 mL glass bottles for 7 days during which the samples were monitored for phase separation phenomena every day. The unstable slurry samples were separated such that the water or low viscosity solution formed a top layer and the graphite or the graphite/silicon solution formed a bottom layer in the glass bottles. The graphite or graphite/silicon slurries were determined to be stable if they stayed in solution for 5 or more days.

Rheology Measurements

Viscosities of the experimental slurry compositions were measured with a TA Rheometer from TA Instruments® (New Castle, Del.) as a function of shear rate at 25° C. using a cone and plate geometry.

Additionally, the viscosities of several slurry compositions, as identified below, were also measured with a Brookfield® viscometer from Brookfield Engineering Laboratories, Inc. (Middleboro, Mass.) at 3 rpm and 30 rpm with spindle 4 in a 50 mL sample of the below identified slurry compositions.

Adhesion Measurements

Adhesion measurements were obtained by performing a 90 Degree Peel Test on electrodes formed by coating and drying the slurry compositions, as identified above, on copper current collectors.

The electrodes were formed by coating the slurry compositions on copper current collectors having a thickness of approximately 20 µm and then used a tape caster (doctor blade) to lessen the slurry layer to a wet thickness of approximately 230 μm. The copper current collector coated with the slurry composition was dried at room temperature for a few hours until most of the water evaporated from the coated current collector and then it was placed in a vacuum oven at approximately 110° C. for approximately 30 minutes to evaporate all the water from the slurry composition to form a film on the copper current collector having a thickness of approximately 120 μm, forming an anode electrode. The current collector coated with the dry film was then placed in a roll press for approximately one minute until the film had a thickness of approximately 70 μm. Alternatively, electrodes were made with a film thickness of approximately 35 μm.

The electrodes were then subjected to a 90 degree peel test using a peel test fixture from Instron®, Norwood, Mass. The individual electrode samples were mounted on a stainless steel plate with 3M® double sided scotch tape from 3M Corporation (St. Paul, Minn.) after which the film, which was also stuck to the scotch tape, was peeled off at a rate of 1 foot/min by the Instron® instrument during which the Instron® Instrument measured the force necessary to peel the film off the current collector.

An adhesion above 0.3 gf/mm is generally considered to be acceptable, while an adhesion value above 0.5 gf/mm is considered to be good.

The following tables demonstrate that the adhesion of films formed from slurries containing redispersible powders are as good as, if not better than, the adhesion of films formed from slurries containing traditional latexes like styrene butadiene latex. An adhesion above 0.3 gf/mm is generally considered to be acceptable, while an adhesion value above 0.5 gf/mm is considered to be good.

Examples 1-5

Table 2 presents the formulations for Examples 1-5 which varied in the types of latex or redispersible powder used in the slurry compositions (see Table 1 for the ratio of components) but kept constant the type of graphite and carboxymethyl cellulose used therein. Examples 1-5 were prepared by the "wet" process and the normalized ratio of graphite, carboxymethyl cellulose, and redispersible powder (or latex) was held constant at 100/1/1.5, respectively.

TABLE 2

| Example # | Graphite | CMC | Latex | RDP |
|---|---|---|---|---|
| 1 | FSNC-1 | Aqualon ® Aqu D-5139 | JSR ® TR2001 | |
| 2 | FSNC-1 | Aqualon ® Aqu D-5139 | | RDP-1 |

TABLE 2-continued

| Example # | Graphite | CMC | Latex | RDP |
|---|---|---|---|---|
| 3 | FSNC-1 | Aqualon ® Aqu D-5139 | | Dehydro ® 6480 |
| 4 | FSNC-1 | Aqualon ® Aqu D-5139 | | Dehydro ® 7552 |
| 5 | FSNC-1 | Aqualon ® Aqu D-5139 | NONE | NONE |

Ingredients listed in Table 2:
(1) FSNC-1: Natural Graphite from Shanshan Tech Co., Shanghai, China; 15 μm particle size; Tap Density: 1.13 g/cc; Capacity: 343 mAh/g; BET surface area: 1.42 m²/g.
(2) Aqualon® Aqu D-5139: Commercially available carboxymethyl cellulose from Ashland, Inc. (Wilmington, DE) with a degree of substitution from 0.82-0.95 and a Brookfield ® viscosity of 5,700-9,000 cps for a 1% solution at 30 rpm with spindle 4.
(3) JSR ® TR2001: Commercially-available styrene butadiene latex from JSR Corporation, Tokyo, Japan.
(4) Dehydro ® 6480: Redispersible powder from Acquos Pty Ltd. (Camp Bettefield, Australia) comprising vinyl acrylic latex.
(5) Dehydro ® 7552: Redispersible powder from Acquos Pty Ltd. (Camp Bettefield, Australia) comprising styrene acrylic latex.

Examples 1-5 were subjected to the above-described tests to determine rheology measurements and adhesion measurements. Table 3 presents the results. As is apparent from Table 3, the slurries were subjected to both the TA Rheometer at 25° C. using a cone and plate geometry and the Brookfield® viscometer at 30 rpm with spindle 4.

TABLE 3

| | TA Rheometer Data (cps) | | | | Brookfield ® Viscosity | Slurry | Adhesion |
|---|---|---|---|---|---|---|---|
| Example # | 1.13 s⁻¹ | 5.2 s⁻¹ | 11.34 s⁻¹ | 113.4 s⁻¹ | (cps) | Stability | (gf/mm) |
| 1 | 15210 | 7916 | 5268 | 1226 | 10798 | 5 days | 0.79 |
| 2 | 14380 | 7979 | 5606 | 1462 | 10498 | 5 days | 0.62 |
| 3 | 12340 | 7743 | 5587 | 1498 | 10578 | 5 days | 0.47 |
| 4 | 10440 | 6369 | 4566 | 1223 | 9038 | 5 days | 0.55 |
| 5 | 6581 | 4359 | 3302 | 1053 | 7478 | 3 days | 0.28 |

Figure 4:
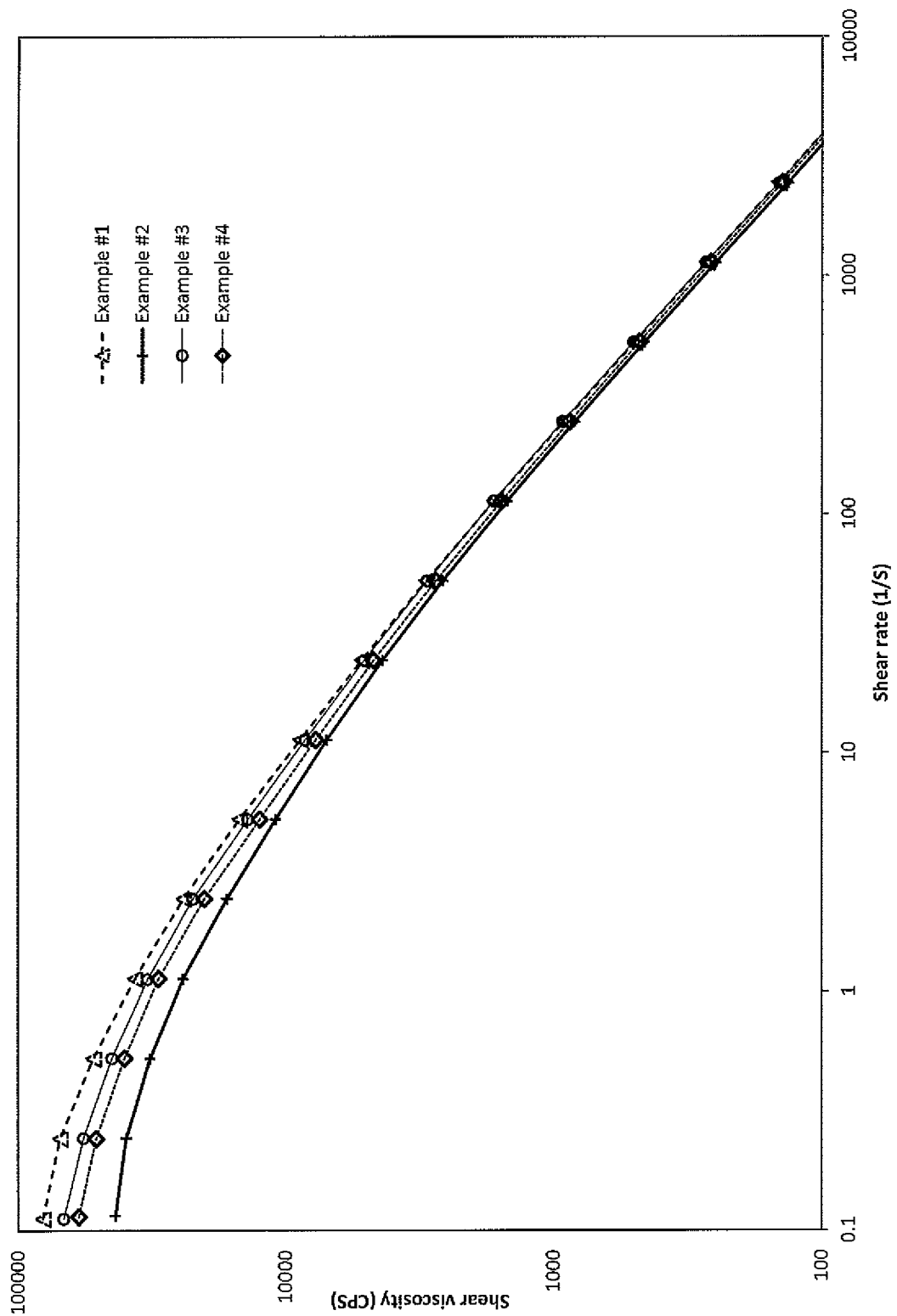
FIG. 4 is a graphical representation comparing the viscosities of slurry compositions containing a redispersible powder or styrene butadiene latex emulsion, as described in Examples 1-4 below.

As illustrated by Table 3, the viscosities of the compositions containing redispersible powders instead of just latex (Examples 2-4) are comparable to Example 1 which contains latex. Additionally, the slurry samples containing various redispersible powders (Examples 2-4) were stable (i.e., the graphite and binder did not separate) during the 5 days of storage. Further, Table 3 suggests that the adhesion values of the films bonded to copper foil and comprised of redispersible powders and CMC (Examples 2-4) are equal in acceptable quality (i.e., close to or over 0.5 gf/mm) to the film comprised of latex and CMC (Example 1). Examples 2-4 also have much better adhesion and higher flexibility than the film with only CMC and graphite (Example 5). FIG. 4 is a graphical representation of the viscosities of Examples 1-4 as obtained by the TA Rheometer.

Examples 6-12

Table 4 presents the formulations for Examples 6-12 which vary in the types and amounts of latex or redispersible powder used in the slurry compositions (see Table 1 for the ratio of components) but keep constant the type of graphite and carboxymethyl cellulose used therein. Examples 6-12 were prepared by the "wet" process and the normalized ratio of graphite, carboxymethyl cellulose, and redispersible powder (or latex) ranged from 100/1/1.5 to 100/1/3 due to the increased levels of RDP or latex for some of the examples.

TABLE 4

| Example # | Graphite | CMC | Latex | RDP | Normalized Ratio (Graphite/CMC/Latex) or (Graphite/CMC/RDP) |
|---|---|---|---|---|---|
| 6 | FSNC-1 | Aqualon ® Aqu D-5284 | JSR ® TR2001 | | 100/1/1.5 |
| 7 | FSNC-1 | Aqualon ® Aqu D-5284 | | RDP-1 | 100/1/1.5 |
| 8 | FSNC1 | Aqualon ® Aqu D-5284 | | RDP-1 | 100/1/2 |
| 9 | FSNC-1 | Aqualon ® Aqu D-5284 | | RDP-1 | 100/1/2.5 |
| 10 | FSNC-1 | Aqualon ® Aqu D-5284 | | RDP-1 | 100/1/3 |
| 11 | FSNC-1 | Aqualon ® Aqu D-5284 | Celvolit ® 1388 | | 100/1/1.5 |
| 12 | FSNC-1 | Aqualon ® Aqu D-5284 | Rovene ® 4002 | | 100/1/1.5 |

Ingredients listed in Table 4:
(1) FSNC-1: Graphite from Shanshan Tech Co., Shanghai, China.
(2) Aqualon ® Aqu D-5284: Commercially available carboxymethyl cellulose from Ashland, Inc. (Wilmington, DE) with a degree of substitution from 0.8-0.95 and a Brookfield ® viscosity of 2,500-4,500 cps for a 1% solution at 30 rpm with spindle 4.
(3) JSR ® TR2001: Commercially-available styrene butadiene latex from JSR Corporation, Tokyo, Japan.
(4) Celvolt ® 1388: Ethylene vinylacetate copolymer latex from Celanese Co, Houston, Tx. Tg = −10° C.
(5) Rovene ® 4002: Commercially-available carboxylated styrene butadiene latex emulsion from Mallard Creek Polymers, Charlotte, North Carolina.

Examples 6-12 were subjected to the above-described tests to determine rheology measurements, slurry stability test, and adhesion measurements. Table 5 presents the results. As is apparent from Table 5, the slurries of Examples 6-12 were also subjected to both the TA Rheometer at 25° C. using a cone and plate geometry and the Brookfield® viscometer at 30 rpm with spindle 4.

TABLE 5

| | TA Rheometer Data (Shear Rate, cps) | | | | Brookfield ® | Slurry | Adhesion |
|---|---|---|---|---|---|---|---|
| Example # | 1.13 s⁻¹ | 5.2 s⁻¹ | 11.34 s⁻¹ | 113.4 s⁻¹ | Viscosity (cps) | Stability | (gf/mm) |
| 6 | 8998 | 4940 | 3371 | 847 | 7178 | 5 days | 0.96 |
| 7 | 11800 | 6669 | 4631 | 1171 | 9098 | 5 days | 0.48 |
| 8 | 10120 | 5967 | 4220 | 1110 | 8398 | 5 days | 0.80 |
| 9 | 9368 | 5711 | 4083 | 1108 | 8298 | 5 days | 1.04 |
| 10 | 9513 | 5734 | 4094 | 1101 | 8278 | 5 days | 1.30 |
| 11 | 10710 | 4699 | 3269 | 978 | 7678 | 5 days | 0.47 |
| 12 | 3892 | 2494 | 1954 | 729 | 4219 | 3 days | 0.75 |

Figure 5:
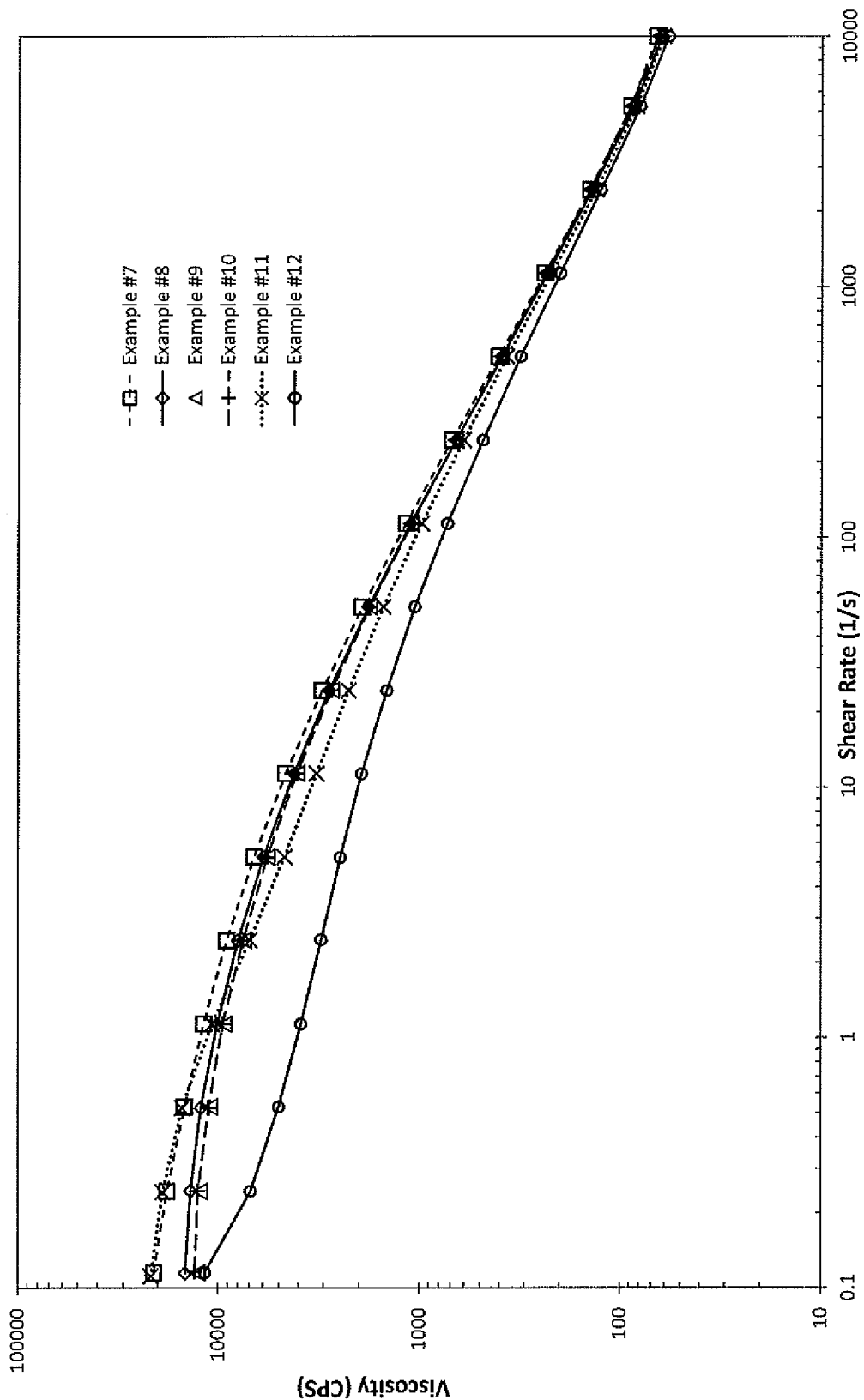
FIG. 5 is a graphical representation comparing the viscosities of slurry compositions containing a redispersible powder or styrene butadiene latex emulsion, as described in Examples 7-12 below.

As illustrated by Table 5, the viscosities of the compositions containing redispersible powders instead of just latex (Examples 7-10) are comparable to Examples 6, 11, and 12, which only contain a latex. Table 5 also suggests that the adhesion measurements of the films comprising redispersible powders instead of just latex (Examples 7-10) are equal in acceptable quality (i.e., close to or over 0.5 gf/mm) to Examples 6 and 11, which contained only a latex. Further, Table 5 suggests that Aqualon® Aqu D-5284 carboxymethyl cellulose may improve the adhesion of the binder composition to the copper current collector, especially when added to increasing amounts of redispersible powder, when compared with Table 3, which presents the adhesion data for compositions containing Aqualon® Aqu D-5139. FIG. 5 is a graphical representation of the viscosities of Examples 7-12 as obtained by the TA Rheometer.

Examples 13-24

Table 6 presents Examples 13-24 which vary in the types and amounts of latex or redispersible powder and vary in the types of carboxymethyl cellulose used in the slurry compositions but keep constant the type of MAG graphite used therein. Examples 13-24 were prepared by the "wet" process (with 40% total solid in water) and the normalized ratio of graphite, carboxymethyl cellulose, and redispersible powder (or latex) ranged from 100/1/1.5 to 100/1/3 due to the increased levels of RDP or latex for some of the examples.

TABLE 6

| Example # | Graphite | CMC | Latex | RDP | Normalized Ratio (Graphite/CMC/Latex) or (Graphite/CMC/RDP) |
|---|---|---|---|---|---|
| 13 | MAG | Aqualon ® Aqu D-5139 | | RDP-2 | 100/1/1.5 |
| 14 | MAG | Aqualon ® Aqu D-5283 | | RDP-2 | 100/1/1.5 |
| 15 | MAG | Aqualon ® Aqu D-5139 | | RDP-2 | 100/1/3 |
| 16 | MAG | Aqualon ® Aqu D-5283 | | RDP-2 | 100/1/3 |
| 17 | MAG | Aqualon ® Aqu D-5139 | NONE | NONE | |
| 18 | MAG | Aqualon ® Aqu D-5283 | NONE | NONE | |

TABLE 6-continued

| Example # | Graphite | CMC | Latex | RDP | Normalized Ratio (Graphite/CMC/Latex) or (Graphite/CMC/RDP) |
|---|---|---|---|---|---|
| 19 | MAG | Aqualon ® Aqu D-5139 | | RDP-1 | 100/1/1.5 |
| 20 | MAG | Aqualon ® Aqu D-5283 | | RDP-1 | 100/1/1.5 |
| 21 | MAG | Aqualon ® Aqu D-5139 | | RDP-1 | 100/1/3 |

TABLE 6-continued

| Example # | Graphite | CMC | Latex | RDP | Normalized Ratio (Graphite/CMC/Latex) or (Graphite/CMC/RDP) |
|---|---|---|---|---|---|
| 22 | MAG | Aqualon ® Aqu D-5283 | | RDP-1 | 100/1/3 |
| 23 | MAG | Aqualon ® Aqu D-5139 | Zeon ® BM-480B | | 100/1/1.5 |
| 24 | MAG | Aqualon ® Aqu D-5283 | Zeon ® BM-480B | | 100/1/1.5 |

Ingredients listed in Table 6:
(1) MAG: Synthetic graphite from Hitachi Chemical Co., Tokyo, Japan. Average particle size: 22.4 microns. Tap density: 0.78 g/cm$^3$. Bet surface area: 3.7 m$^2$/g.
(2) Aqualon ® Aqu D-5139: Commercially available carboxymethyl cellulose from Ashland, Inc. (Wilmington, DE) with a degree of substitution from 0.82-0.95 and a Brookfield® viscosity of 5,700-9,000 cps for a 1% solution pm with spindle 4.
(3) Aqualon ® Aqu D-5283: Commercially available carboxymethyl cellulose from Ashland, Inc. (Wilmington, DE) with a degree of substitution from 0.65-0.9 and a Brookfield® viscosity of 4,000-9,000 cps for a 1% solution at 30 rpm with spindle 4.
(4) Zeon ® BM-480B: Commercially-available styrene butadiene latex from Zeon Corporation, Tokyo, Japan.

Figure 6:
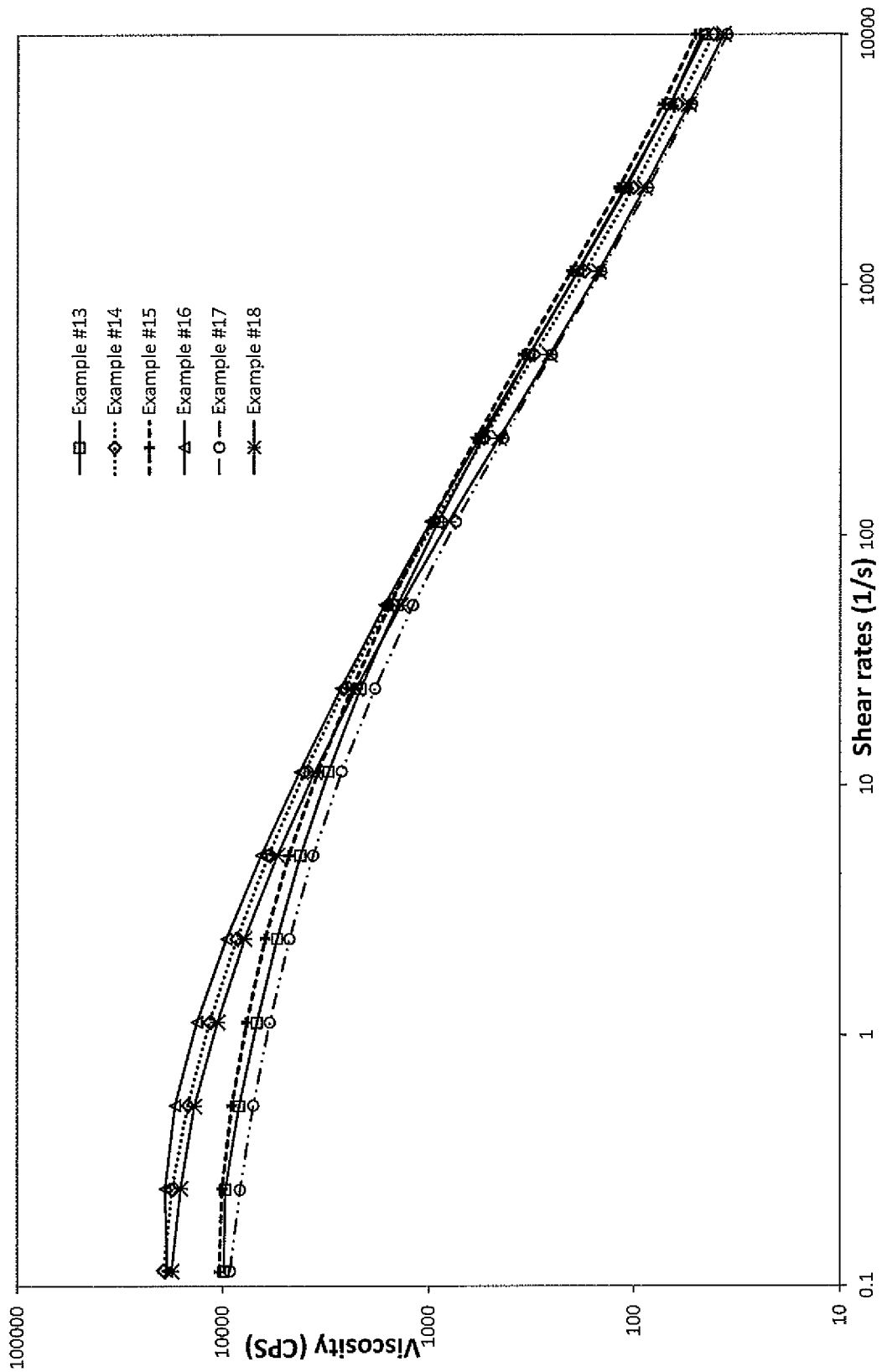
FIG. 6 is a graphical representation comparing the viscosities of slurry compositions containing different carboxymethyl celluloses, as described in Examples 13-18 below.
Figure 7:
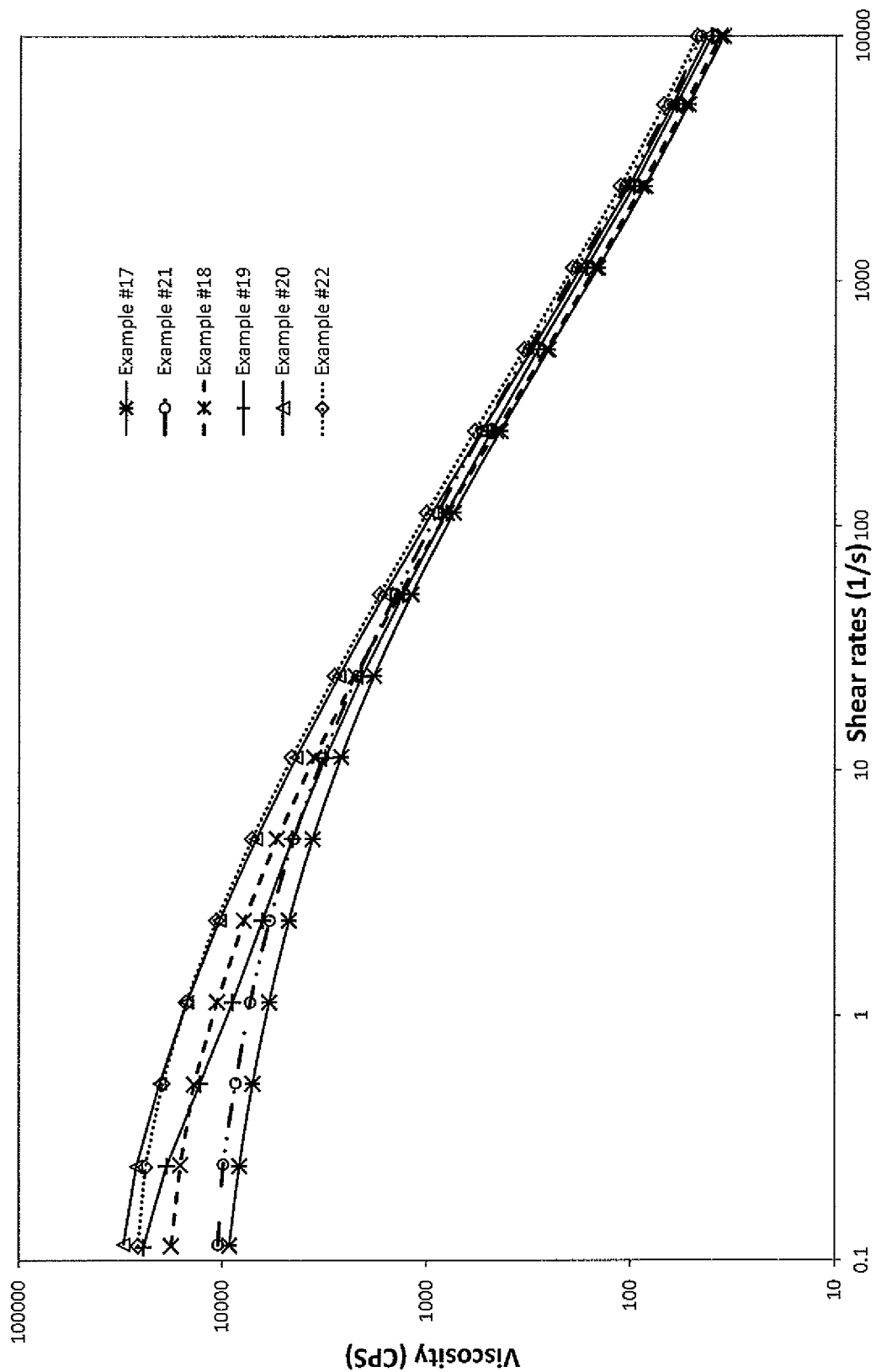
FIG. 7 is a graphical representation comparing the viscosities of slurry compositions containing different carboxymethyl celluloses, as described in Examples 17-22 below.
Figure 8:
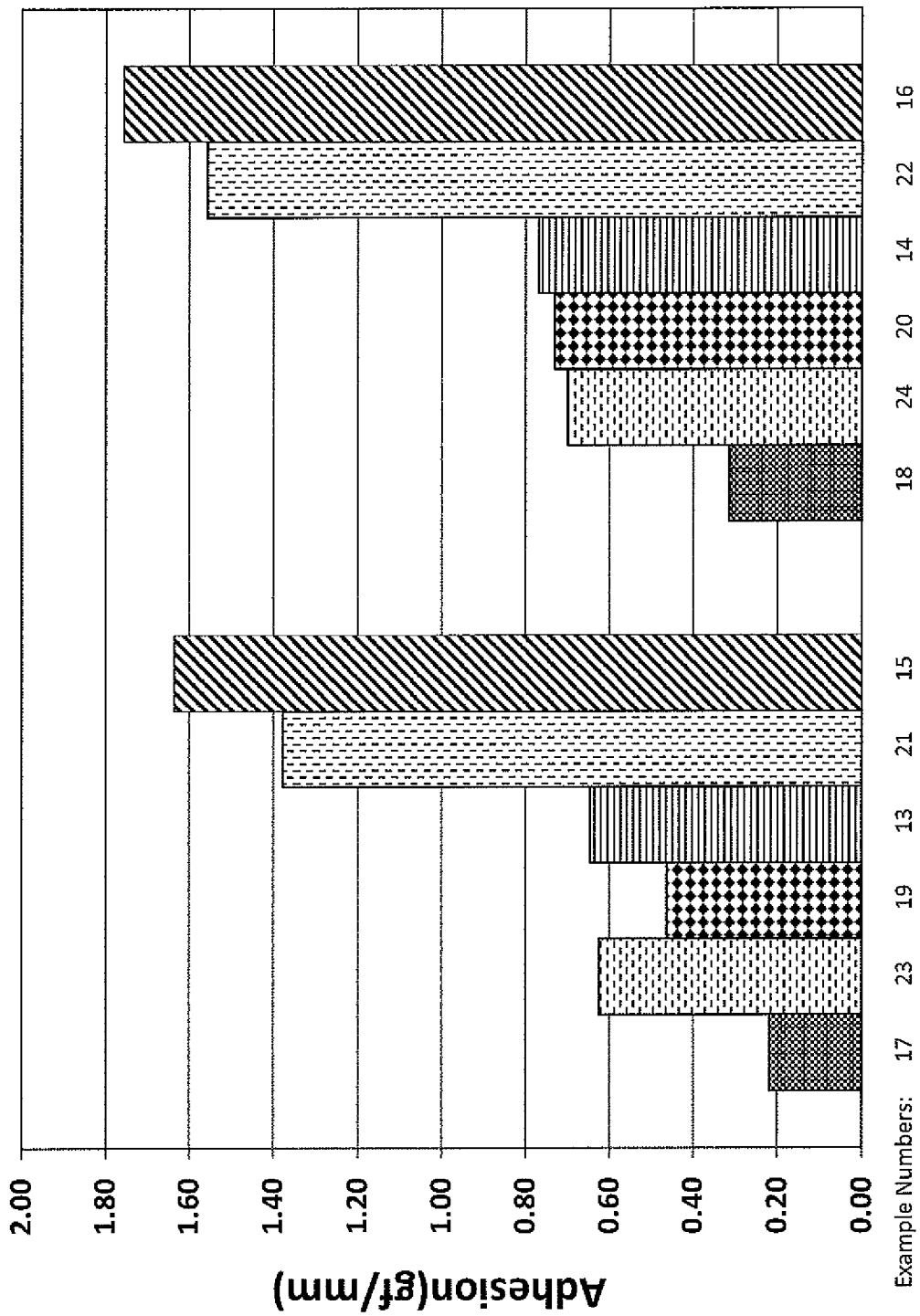
FIG. 8 is a graphical representation of the adhesion data for Examples 17-24, as described below.

Examples 13-24 were subjected to the above-described tests to determine rheology measurements and adhesion measurements. FIG. 6 presents the viscosity data for Examples 13-18, FIG. 7 presents the viscosity data for Examples 17-22, and FIG. 8 presents the adhesion data for Examples 13-24. FIGS. 6 and 7 show the viscosities versus shear rates for Examples 13-22, which indicate that the type of carboxymethyl cellulose do not greatly impact the rheology of the compositions. FIG. 8 also suggests that the adhesion measurements of the films comprising redispersible powders instead of just latex (Examples 13-16 and 19-22) are equal in acceptable quality, if not better (i.e., close to or over 0.5 gf/mm), as the examples which only contain a latex (Examples 17-18 and 23-24). Further, FIG. 8 suggests that compositions containing Aqualon® Aqu D-5283 carboxymethyl cellulose (Examples 14, 16, 18, 20, 22, and 24) instead of Aqualon® Aqu D-5139 (Examples 13, 15, 17, 19, 21, and 23) may improve the adhesion of the binder composition to the copper current collector, especially when added in increasing amounts (See, Examples 16 and 22 compared with Examples 15 and 21).

Examples 25-32

Table 7 presents Examples 25-32 which vary in the types of carboxymethyl cellulose and latex or redispersible powder used in the slurry compositions (40% total solids formulation) but keep constant the type of graphite used therein. Additionally, Examples 25-32 vary as to the preparation process used to make the samples, i.e., Examples 25, 27, 29, and 31 were prepared by the "dry" process and Examples 26, 28, and 30 were prepared by the "wet" process, wherein the normalized ratio of graphite, carboxymethyl cellulose, and redispersible powder (or latex) was held constant at 100/1/1.5, respectively, for the compositions prepared by both the wet or dry processes. Examples 25-32 were also subjected to the adhesion test as described above, the results of which are presented in Table 7.

TABLE 7

| Example # | Graphite | CMC | Latex | RDP | Preparation Process | Adhesion (gf/mm) |
|---|---|---|---|---|---|---|
| 25 | MAG | Aqualon ® Aqu D-5139 | Zeon ® BM-400 | | Dry | 0.61 |
| 26 | MAG | Aqualon ® Aqu D-5139 | Zeon ® BM-400 | | Wet | 0.53 |
| 27 | MAG | Aqualon ® Aqu D-5139 | | RDP-2 | Dry | 0.49 |
| 28 | MAG | Aqualon ® Aqu D-5139 | | RDP-2 | Wet | 0.65 |
| 29 | MAG | Aqualon ® Aqu D-5283 | | RDP-2 | Dry | 0.65 |
| 30 | MAG | Aqualon ® Aqu D-5283 | | RDP-2 | Wet | 0.77 |
| 31 | MAG | Aqualon ® Aqu D-5283 | | 40 wt % RDP-2 in aqueous solution | Dry | 0.69 |
| 32 | MAG | Aqualon ® Aqu D-5283 | | 40 wt % RDP-2 in aqueous solution | Dry | 0.72 |

Ingredients listed in Table 7:
(1) MAG: Synthetic graphite from Hitachi Chemical Co., Tokyo, Japan. Average particle size: 22.4 microns. Tap density: 0.78 g/cm$^3$. Bet surface area: 3.7 m$^2$/g.
(2) Aqualon ® Aqu D-5139: Commercially available carboxymethyl cellulose from Ashland, Inc. (Wilmington, DE) with a degree of substitution from 0.82-0.95 and a Brookfield ® viscosity of 5,700-9,000 cps for a 1% solution at pm with spindle 4.
(3) Aqualon ® Aqu D-5283: Commercially available carboxymethyl cellulose from Ashland, Inc. (Wilmington, DE) with a degree of substitution from 0.65-0.9 and a Brookfield ® viscosity of 4,000-9,000 cps for a 1% solution at 30 rpm with spindle 4.
(4) Zeon ® BM-400: Commercially-available styrene butadiene latex from Zeon Corporation, Tokyo, Japan.

As illustrated by Table 7, the adhesion measurements of the films comprising redispersible powders instead of just latex (Examples 27-32) are acceptable (i.e., close to or over 0.5 gf/mm) and, in fact are equal to or better than Examples 25 and 26 which contained just latex. Further, Table 7 suggests that Aqualon® Aqu D-5283 carboxymethyl cellulose (Examples 29, 30, and 32) may improve the adhesion of the binder composition to the copper current collector when compared to Aqualon® Aqu D-5139 (25-28, and 31) and Aqualon® Aqu D-5284 carboxymethyl celluloses (See, Examples 6-12 of Table 5). Additionally, Table 7 suggests that both the wet and dry processes can provide very good adhesion (i.e., approximately 0.5 gf/mm or more).

Examples 33-38

Table 8 presents Examples 33-38 which vary in the types of graphite and latex or redispersible powder used in the slurry compositions but keep constant the type of carboxymethyl cellulose used therein. Examples 33-38 were prepared by the "dry" process, wherein the normalized ratio of graphite, carboxymethyl cellulose, and redispersible powder (or latex) was held constant at 100/1/1.5, respectively. Examples 33-38 were also subjected to the above-described adhesion test, the results of which are also presented in Table 8.

TABLE 8

| Example # | Graphite | CMC | Latex | RDP | Adhesion (gf/mm) |
|---|---|---|---|---|---|
| 33 | MAG | Aqualon® Aqu D-5139 | Rovene® 4002 | | 0.87 |
| 34 | FSNC-1 | Aqualon® Aqu D-5139 | Rovene® 4002 | | 1.06 |

TABLE 8-continued

| Example # | Graphite | CMC | Latex | RDP | Adhesion (gf/mm) |
|---|---|---|---|---|---|
| 35 | MAG | Aqualon® Aqu D-5139 | Celvolit® 1388 | | 0.72 |
| 36 | FSNC-1 | Aqualon® Aqu D-5139 | Celvolit® 1388 | | 1.02 |
| 37 | MAG | Aqualon® Aqu D-5139 | | RDP-2 | 0.79 |
| 38 | FSNC-1 | Aqualon® Aqu D-5139 | | RDP-2 | 0.82 |

Ingredients listed in Table 8:

(1) MAG: Synthetic graphite from Hitachi Chemical Co., Tokyo, japan. Average particle size: 22.4 microns. Tap density: 0.78 g/cm$^3$. Bet surface area: 3.7 m$^2$/g.
(2) FSNC-1: Graphite from Shanshan Tech Co., Shanghai, China.
(3) Aqualon® Aqu D-5139: Commercially available carboxymethyl cellulose from Ashland, Inc. (Wilmington, DE) with a degree of substitution from 0.82-0.95 and a Brookfield® viscosity of 5,700-9,000 cps for a 1% solution at 30 rpm with spindle 4.
(4) Rovene® 4002: Commercially-available carboxylated styrene butadiene latex emulsion from Mallard Creek Polymers, Charlotte, North Carolina.
(5) Celvolit® 1388: Ethylene vinylacetate copolymer latex from Celanese Co, Houston, Tx. Tg. = –10° C.

As illustrated by Table 8, the adhesion measurements of the films comprising redispersible powders instead of just latex (Examples 37-38) are acceptable (i.e., close to or over 0.5 gf/mm). Additionally, Examples 33-38 illustrate that the adhesion of compositions comprising FSNC-1 graphite have been found to be better than compositions comprising MAG graphite.

Slurry stability was also measured for four compositions (Examples 39-42) containing only 1.5% by weight carboxymethyl cellulose and 2.25% by weight redispersible powder or latex in water. For these stability tests, graphite was not added to the slurries. The binder, i.e., CMC and RDP (or latex), is considered to have good stability if the CMC and RDP or latex stay in solution for 5 days or more. Table 9 illustrates that the stability for slurries comprising redispersible powders and CMC have as good of stability as slurries containing a styrene butadiene latex.

TABLE 9

| Example # | CMC | Latex | RDP | Slurry Viscosity (cps) (3/30 RPM) | Slurry Stability | Adhesion (gf/mm) |
|---|---|---|---|---|---|---|
| 39 | Aqualon® Aqu D-5284 | JSR® TR2001 | | 16600/5760 | Stable for at least 7 days | 0.68 |
| 40 | Aqualon® Aqu D-5284 | | RDP-1 | 40400/9780 | Stable for at least 7 days | 0.58 |
| 41 | Aqualon® Aqu D-5284 | | Dehydro® 6480 | 14800/6800 | Stable for at least 7 days | 0.46 |
| 42 | Aqualon® Aqu D-5284 | | Dehydro® 7552 | 27994/10320 | Stable for at least 7 days | 0.46 |

Ingredients listed in Table 9:

(1) Aqualon® Aqu D-5284: Commercially available carboxymethyl cellulose from Ashland, Inc. (Wilmington, DE) with a degree of substitution from 0.8-0.95 and a Brookfield® viscosity of 2,500-4,500 cps for a 1% solution at 30 rpm with spindle 4.
(2) JSR® TR2001: Commercially-available styrene butadiene latex from JSR Corporation, Tokyo, Japan.
(3) Dehydro® 6480: Redispersible powder from Acquos Pty Ltd. (Camp Bettefield, Australia) comprising vinyl acrylic latex.
(4) Dehydro® 7552: Redispersible powder from Acquos Pty Ltd. (Camp Bettefield, Australia) comprising styrene acrylic latex.

Electrode Preparation for Electrochemical Tests

Electrodes, specifically anodes, were prepared by coating copper current collectors with slurry compositions containing electrode-active materials, using the methods described above, to form films of a prescribed thickness on the current collectors. The electrodes prepared had either a film thickness of 35 μm or 70 μm.

The slurries coated on the copper current collectors were prepared using the above-described "wet" process. The process comprised: (1) adding 22.9 g of a 0.7 wt % carboxymethyl cellulose (CMC) solution to 15.6 g of graphite and mixing the CMC/graphite mixture for 20 minutes using an overhead mixer, (2) adding 0.6 g of either: (i) a redispersible powder (RDP) solution or (ii) a 40 wt % latex solution to the CMC/graphite mixture, and mixing the CMC/graphite/RDP or latex solution for 20 minutes using an overhead mixer, and (3) adding 0.9 g of deionized water to the CMC/graphite/RDP or latex solution and mixing for 20 minutes with an overhead mixer.

The slurries were prepared using several different formulations. For each formulation, the total amount of solids (i.e., graphite, carboxymethyl cellulose, and latex or redispersible powder) was approximately 47% by weight with the remaining 53% by weight comprising water. As illustrated in the tables below, the type of carboxymethyl cellulose and latex or redispersible powder varied throughout the examples; however, for those examples comprising redispersible powder instead of a latex, the redispersible powder was comprised of 75% by weight latex particles, 20% by weight anticaking agent, and 5% by weight protective colloid, wherein the anticaking agent was calcium carbonate ($CaCO_3$), the protective colloid (or "redispersing aid") was polyvinyl alcohol (PVOH), and the latex particles varied depending on the redispersible powder as presented in the tables below.

Table 10 presents a detailed description of the different slurry compositions that were prepared. For each slurry composition containing redispersible powder, the ratio of the dry components, i.e., only the graphite, carboxymethyl cellulose, and redispersible powder, was 97.5/1/1.5, respectively. Additionally, for each slurry composition containing latex, the latex comprised a mixture of Zeon® BM-400 and Zeon® BM-480B latexes in an equal ratio, such that the ratio of dry components, i.e., only the graphite, carboxymethyl cellulose, Zeon® BM-400, and Zeon® BM-480, was 97.5/1/0.75/0.75, respectively. The stability of slurries A-F and the adhesion of films formed from slurries A-F on copper current collectors were measured using the above-defined procedures, the results of which are also presented in Table 10.

TABLE 10

| Sample # | Graphite | CMC | Latex | RDP | Slurry Stability | Adhesion (gf/mm) |
|---|---|---|---|---|---|---|
| A | MAG | Sunrose® MAC 350 HC | Zeon® BM-400 and Zeon® BM-480B | | 5 days | 0.83 |
| B | MAG | Sunrose® MAC 350 HC | | RDP-2 | 5 days | 0.59 |
| C | MAG | Aqualon® Aqu D-5139 | Zeon® BM-400 and Zeon® BM-480B | | 5 days | 0.68 |
| D | MAG | Aqualon® Aqu D-5139 | | RDP-2 | 5 days | 0.53 |
| E | MAG | Aqualon® Aqu D-5283 | Zeon® BM-400 and Zeon® BM-480B | | 5 days | 0.89 |
| F | MAG | Aqualon® Aqu D-5283 | | RDP-2 | 5 days | 0.69 |

Ingredients listed in Table 10:
(1) MAG: Synthetic graphite from Hitachi Chemical Co., Tokyo Japan
(2) Sunrose® MAC 350 HC: Commercially available carboxymethyl cellulose from Nippon Paper Industries Co. LTD, Tokyo, Japan.
(3) Aqualon® Aqu D-5139: Commercially available carboxymethyl cellulose from Ashland, Inc. (Wilmington, DE) with a degree of substitution from 0.82-0.95 and a Brookfield® viscosity of 5,700-9,000 cps for a 1% solution at 30 rpm with spindle 4.
(4) Aqualon® Aqu D-5283: Commercially available carboxymethyl cellulose from Ashland, Inc. (Wilmington, DE) with a degree of substitution from 0.65-0.9 and a Brookfield® viscosity of 4,000-9,000 cps for a 1% solution at 30 rpm with spindle 4.
(5) Zeon® BM-480B: Commercially-available styrene butadiene latex from Zeon Corporation, Tokyo, Japan.
(6) Zeon® BM-400: Commercially-available styrene butadiene latex from Zeon Corporation, Tokyo, Japan.

Half coin cells having a 20 mm diameter and a 3.2 mm height (i.e., "CR-2032" half coin cells) were produced using the anodes described above in combination with lithium metal disc cathodes, a Celgard® polyolefin separator from Celgard LLC (Charlotte, N.C.), and an electrolyte comprising a mixture of organic solvents of ethylene carbonate (EC), ethylmethyl carbonate (EMC), propylene carbonate (PC), and fluorobenzene (FB) in a 30/55/5/10 ratio and 1.1 mole of lithium hexafluorophosphate ($liPF_6$) as the lithium salt. The solid loading for the anode having a 35 μm thick film was 5 mg/cm$^2$ and 10 mg/cm$^2$ for the anode having a 70 μm thick film. The half coin cells were subjected to cyclic and rate capability tests at various rates, as well as a test to determine impedance of the half coin cells. For each test method, the results for Sample A were considered as the reference point for comparison between Samples B-F due to its similarity to typical commercial anodes.

Discharge Capacity Test

The discharge capacities for the half coin cells described above were evaluated at room temperature, 25° C., using a current rate of 0.05 Coulomb© wherein the anodes had a film thickness of 35 μm and 70 μm. The electrodes were evaluated in the voltage range from 0.01 to 1.4 V versus Li/Li$^+$, with a 10 minutes rest time between charging and discharging. A constant voltage ("CV") mode and a constant current ("CC") mode were used in the case of the charging state, i.e. Li insertion into the graphite, and the discharge state, i.e., Li extraction from the graphite, respectively. The results are shown in Tables 11A and 11B and FIGS. 9 and 10.

Rate Capability Test—Lifecycle Characteristics

The rate capabilities of the half coin cells described above were also evaluated at room temperature, 25° C., charging and discharging the half coin cells at a rate of 0.5 Coulomb© for 100 cycles, wherein the anodes had a film of 35 μm and 70 μm. The results are shown in Table 12 and FIGS. 11 and 12.

The rate capabilities of the above-described half coin cells were also evaluated for a range by charging and discharging the cells at a rate of 0.05 C, 0.2 C, and 0.5 C for approximately 5 cycles per rate. The results are shown in Table 13 and FIG. 13.

Impedance

Impedance of the above-described 2032 half coin cells was evaluated for anodes having a film thickness of 70 μm. The battery impedance data was measured using a Solartron® 1260 from Solartron Analytical (Leicester, UK). The results are shown in Table 14 and FIG. 14.

Examples 43-54

As illustrated by Tables 11A and 11B, Samples A-F were subjected to the above-defined discharge capacity test, the results of which correspond to Examples 43-54. Examples 43-48 (Table 11A) correspond to anodes having a film thickness of 35 μm and Examples 49-54 (Table 11B) correspond to anodes having a film thickness of 70 μm.

TABLE 11A

| Example # | Sample # | Film Thickness (μm) | Charge Capacity (mAh/g) | Discharge Capacity (mAh/g) | Coulombic Efficiency (%) |
|---|---|---|---|---|---|
| 43 | A | 35 | 356 | 336 | 94.4 |
| 44 | B | 35 | 357 | 338 | 94.7 |
| 45 | C | 35 | 353 | 335 | 94.9 |
| 46 | D | 35 | 349 | 331 | 94.8 |
| 47 | E | 35 | 351 | 330 | 94.0 |
| 48 | F | 35 | 353 | 334 | 94.6 |

TABLE 11B

| Example # | Sample # | Film Thickness (μm) | Charge Capacity (mAh/g) | Discharge Capacity (mAh/g) | Coulombic Efficiency (%) |
|---|---|---|---|---|---|
| 49 | A | 70 | 358 | 341 | 95.3 |
| 50 | B | 70 | 353 | 337 | 95.5 |
| 51 | C | 70 | 355 | 337 | 94.9 |
| 52 | D | 70 | 347 | 324 | 93.4 |
| 53 | E | 70 | 361 | 344 | 95.3 |
| 54 | F | 70 | 358 | 340 | 95.0 |

Figure 9:
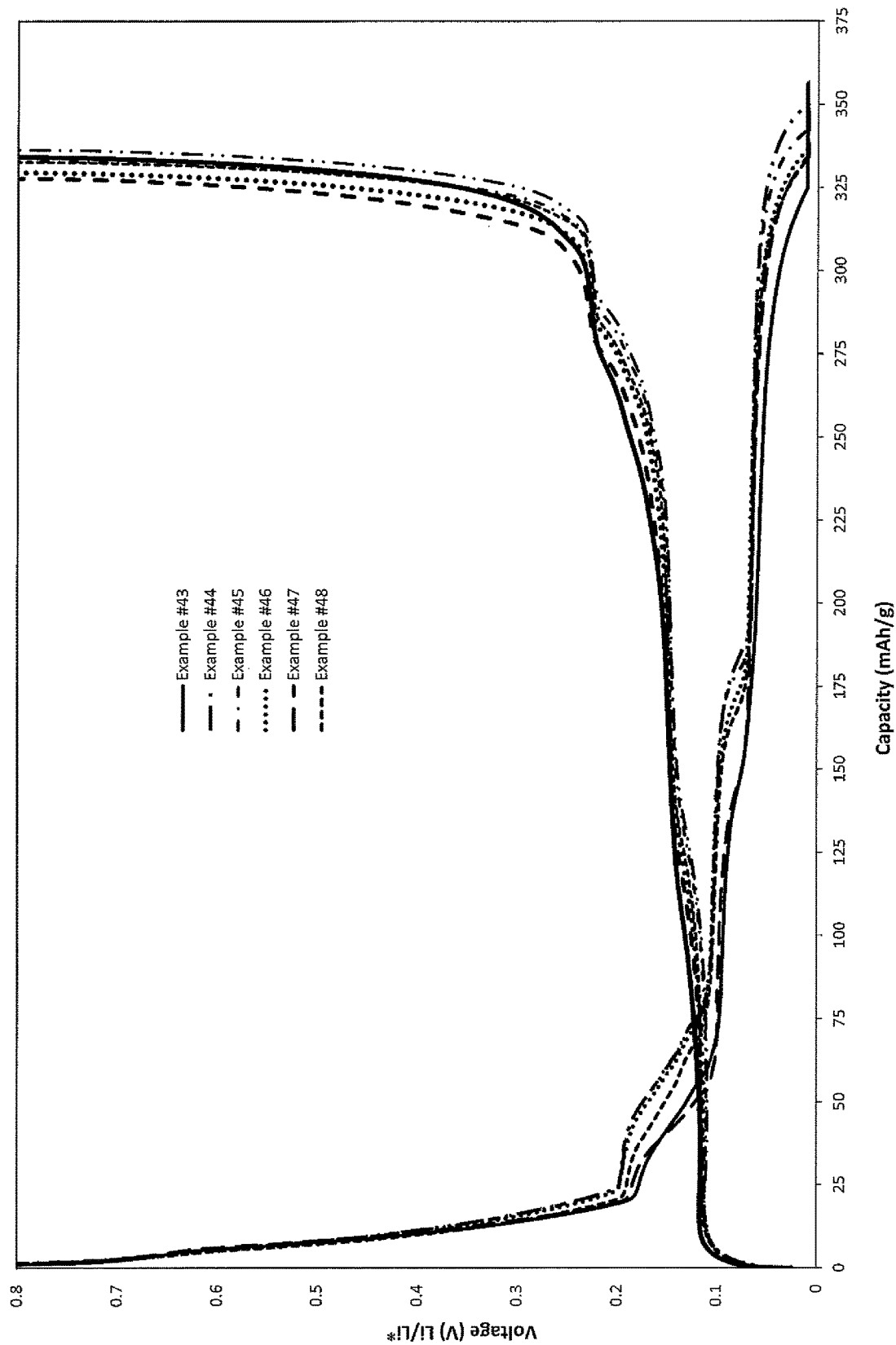
FIG. 9 is a graphical representation of the electrochemical performance for Samples A-F (35 µm anode film thickness) showing a voltage profile at a 0.05 C rate, as described below.
Figure 10:
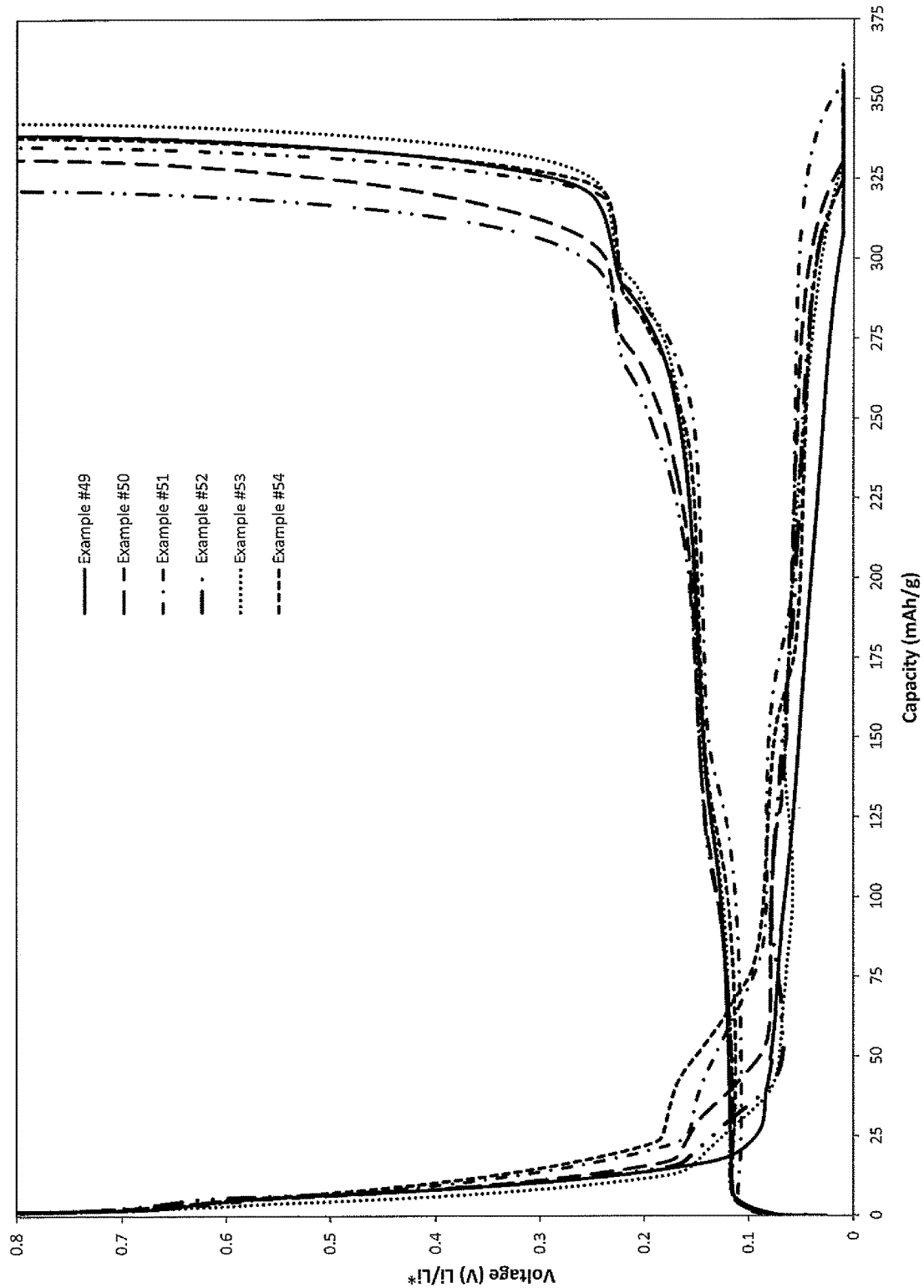
FIG. 10 is a graphical representation of the electrochemical performance for Samples A-F (70 µm anode film thickness) showing a voltage profile at a 0.05 C rate, as described below.

The results presented in Tables 11A and 11B suggest that anodes prepared with redispersible powders instead of latex (Examples 44, 46, 48, 50, 52, and 54) perform as well as, if not better than, anodes prepared with latexes instead of redispersible powders (Examples 43, 45, 47, 49, 51, and 53). FIGS. 9 and 10 graphically depict the charge and discharge capacities over the range of voltages.

Examples 55-66

As illustrated by Table 12, Samples A-F were subjected to the above-defined rate capabilities test by charging and discharging the half coin cells at a rate of 0.5 Coulomb© for 100 cycles, wherein the anodes had a film thickness of 35 μm and 70 μm. Table 12 highlights measurements taken at 50 cycles and 100 cycles, however, FIGS. 11 and 12 graphically present the data obtained for the entire 100 cycles.

TABLE 12

| Example # | Sample # | Film Thickness (μm) | Capacity Retention (%) | | Coulombic Efficiency (%) | |
|---|---|---|---|---|---|---|
| | | | 50 Cycles | 100 Cycles | 50 Cycles | 100 Cycles |
| 55 | A | 35 | 95.4 | 91.2 | 99.9 | 99.9 |
| 56 | B | 35 | 96.2 | 91.0 | 99.9 | 99.9 |
| 57 | C | 35 | 95.8 | 93.1 | 100 | 100 |
| 58 | D | 35 | 95.9 | 91.9 | 99.8 | 99.8 |
| 59 | E | 35 | 96.1 | 92.4 | 99.7 | 99.7 |
| 60 | F | 35 | 96.4 | 91.9 | 100 | 100 |
| 61 | A | 70 | 72 | 54.7 | 97.6 | 98.1 |
| 62 | B | 70 | 83 | 64.5 | 100 | 100 |
| 63 | C | 70 | 68 | 66.1 | 98.7 | 98.1 |
| 64 | D | 70 | 72 | 58.2 | 99.5 | 100 |
| 65 | E | 70 | 72 | 38.8 | 99.7 | 100 |
| 66 | F | 70 | 89 | 79.5 | 100 | 100 |

Figure 11:
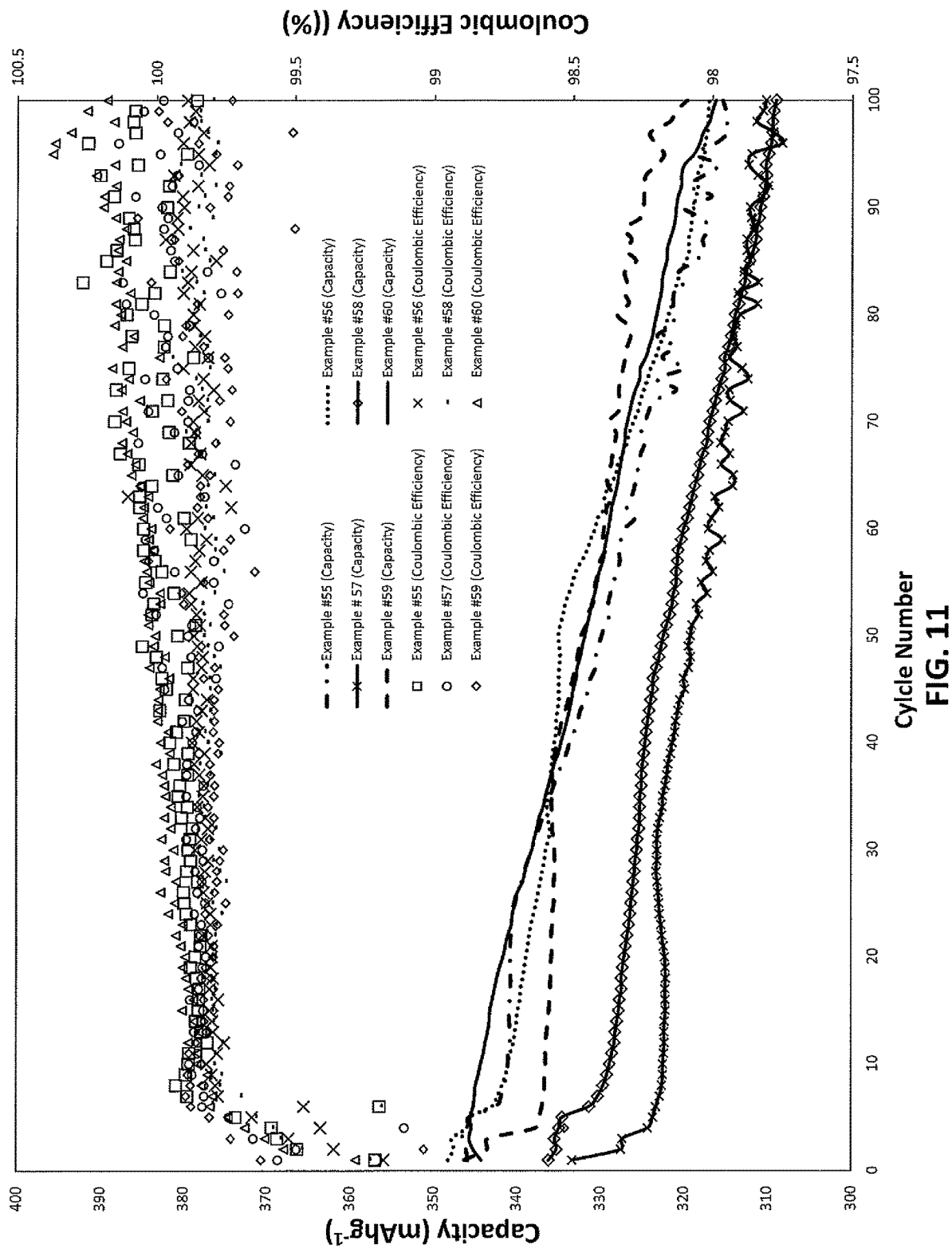
FIG. 11 is a graphical representation of the capacity retention and coulombic efficiency capabilities after 100 cycles for Samples A-F (35 µm anode film thickness), as described below.
Figure 12:
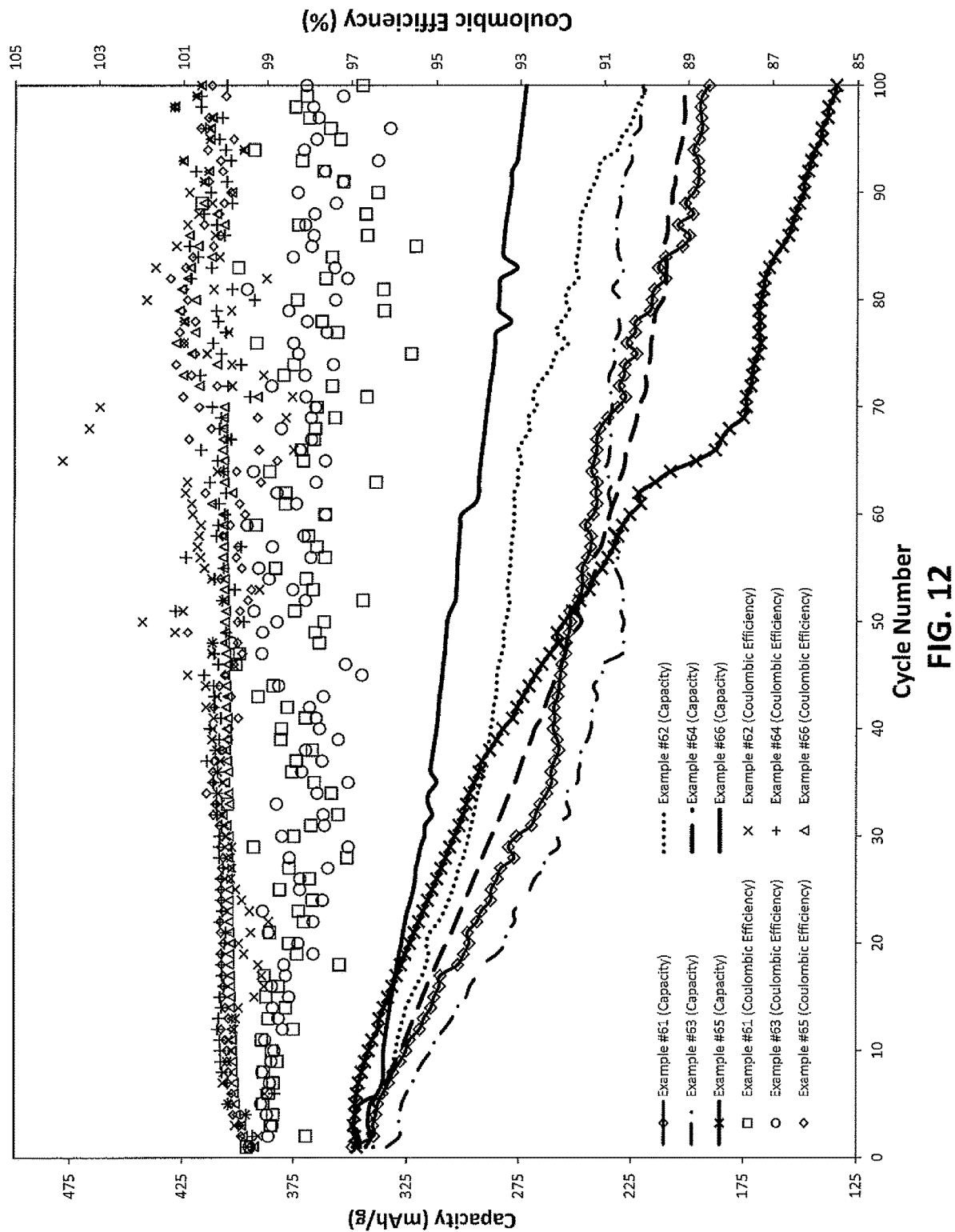
FIG. 12 is a graphical representation of the capacity retention and coulombic efficiency capabilities after 100 cycles for Samples A-F (70 µm anode film thickness), as described below.

The results presented in Table 12 suggest that the majority of the anodes prepared with redispersible powders instead of a latex (Examples 56, 58, 60, 62, 64, 66) perform as well as, if not better than, anodes prepared with latexes instead of redispersible powders (Examples 55, 57, 59, 61, 63, and 65). FIGS. 11 and 12 graphically depict the charge and discharge capacities over the range of voltages.

Examples 67-72

Figure 13:
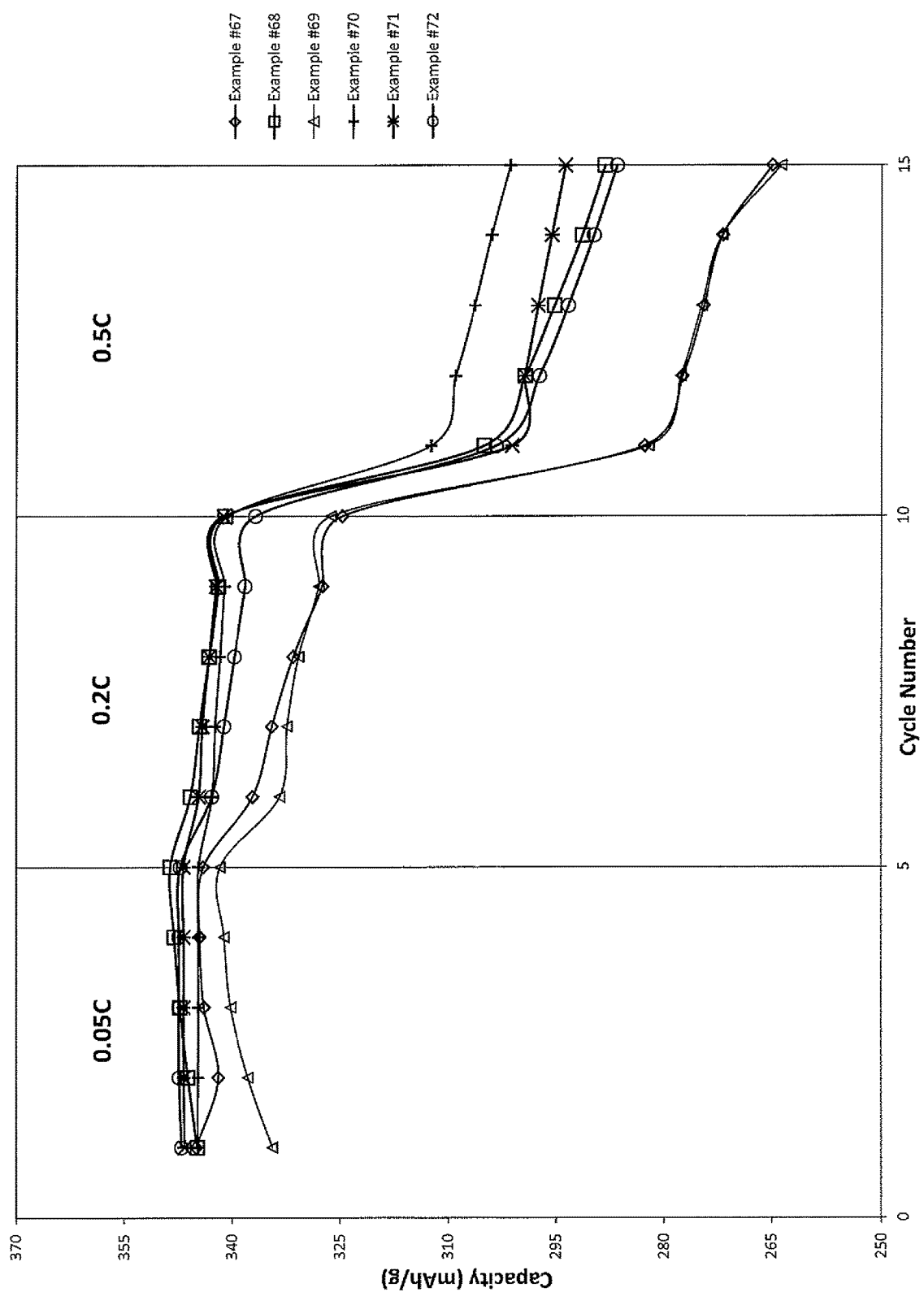
FIG. 13 is a graphical representation of the rate capabilities for Samples A-F (70 µm anode film thickness) as measured by their capacity retentions at rates of 0.05 C, 0.2 C, and 0.5 C for 5 cycles per rate, as described below.

As illustrated by Table 13, Samples A-F were subjected to the above-defined rate capabilities test by charging and discharging the half coin cells at rates of 0.05, 0.2, and 0.5 Coulomb© for 5 cycles at each rate, wherein the anodes had a film thickness of 70 μm. FIG. 13 graphically presents the data obtained for each rate.

TABLE 13

| Example # | Sample # | Capacity Retention (%) for 5 cycles at 0.05 C | Capacity Retention (%) for 5 cycles at 0.2 C | Capacity Retention (%) for 5 cycles at 0.5 C |
|---|---|---|---|---|
| 67 | A | 100 | 96 | 78 |
| 68 | B | 100 | 99 | 84 |
| 69 | C | 99 | 98 | 79 |
| 70 | D | 100 | 98 | 87 |
| 71 | E | 100 | 98 | 85 |
| 72 | F | 100 | 97 | 83 |

The results presented in Table 13 suggest that the majority of the anodes prepared with redispersible powders instead of a latex perform approximately as well as, if not better than, anodes prepared with latexes instead of redispersible powders.

Examples 73-78

Figure 14:
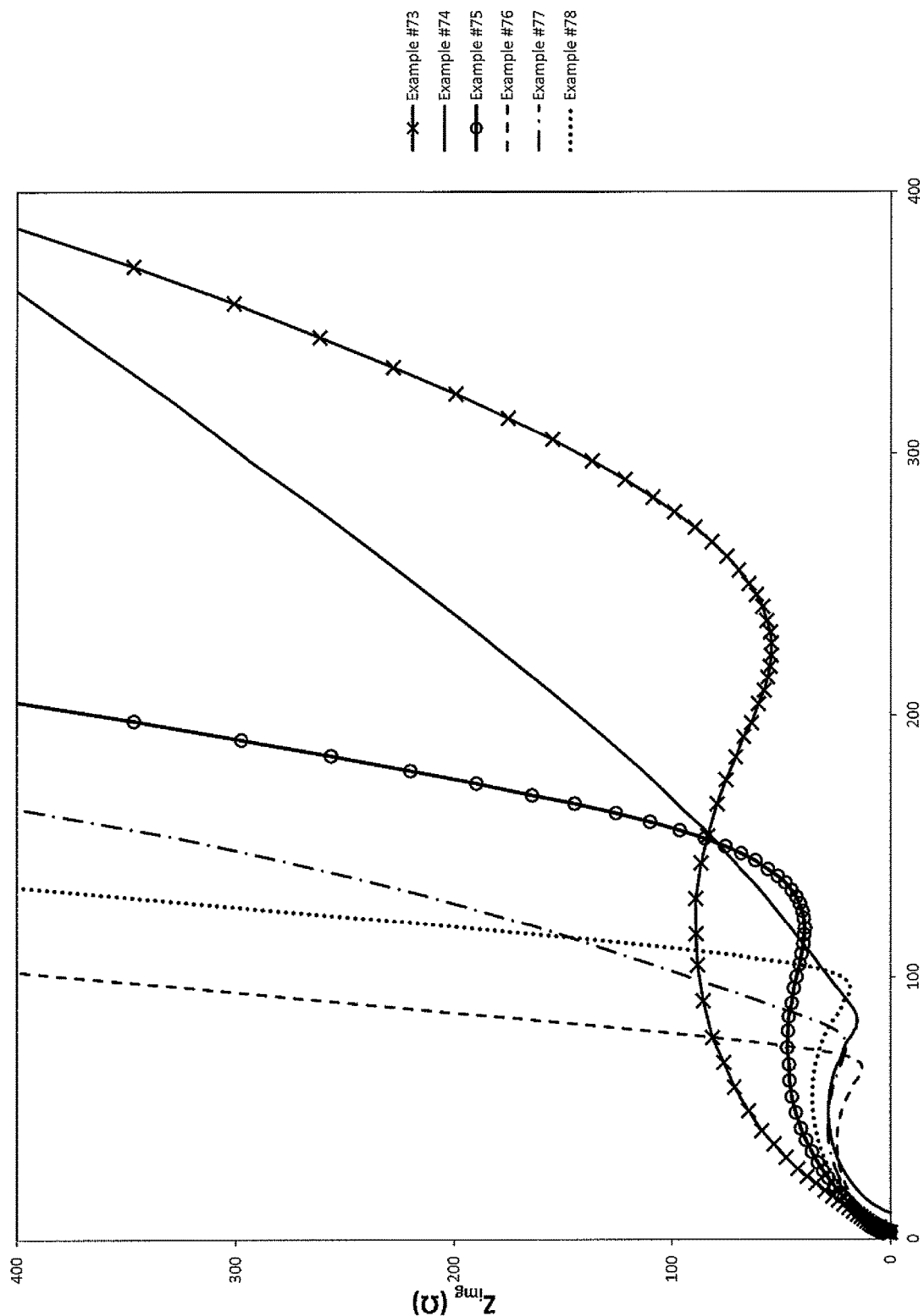
FIG. 14 is a graphical representation of the impedance of Samples A-F (70 µm anode film thickness), as described below.

As illustrated by Table 14, Samples A-F were subjected to the above-defined test for impedance, wherein the anodes tested in the half coin cells had a film thickness of 70 µm. FIG. 14 graphically presents the data obtained for each sample.

TABLE 14

| Example # | Sample # | Impedance ($R_{ct}$) |
|---|---|---|
| 73 | A | 227.7 |
| 74 | B | 82.9 |
| 75 | C | 118.8 |
| 76 | D | 66.0 |
| 77 | E | 75.1 |
| 78 | F | 96.0 |

The current industry standard is for impedance to be less than approximately 228 $R_{ct}$, which is represented by Sample A. As demonstrated by Table 14 and FIG. 14, samples B, D, and F (corresponding to Experiment numbers 74, 76, and 78) all perform better than the industry standard, noting that lower impedance is preferred.

Examples 79-89

Figure 15:
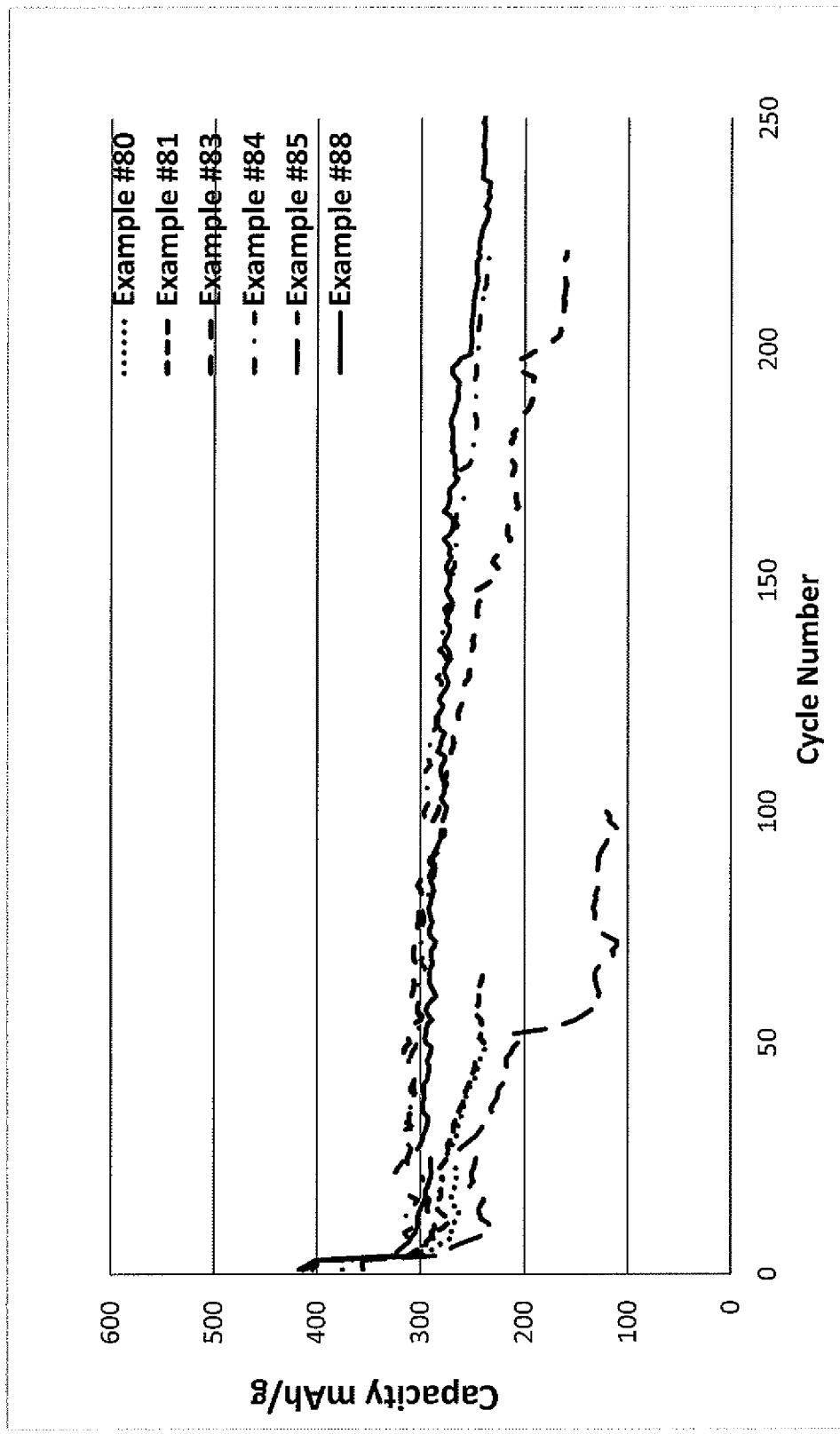
FIG. 15 is graphical representation of the charge capacity of cycle data of $SiO_x$/Graphite (92/5) anode with Aqu D-5283 and various RDP binders (100/0.66/1.2)
Figure 16:
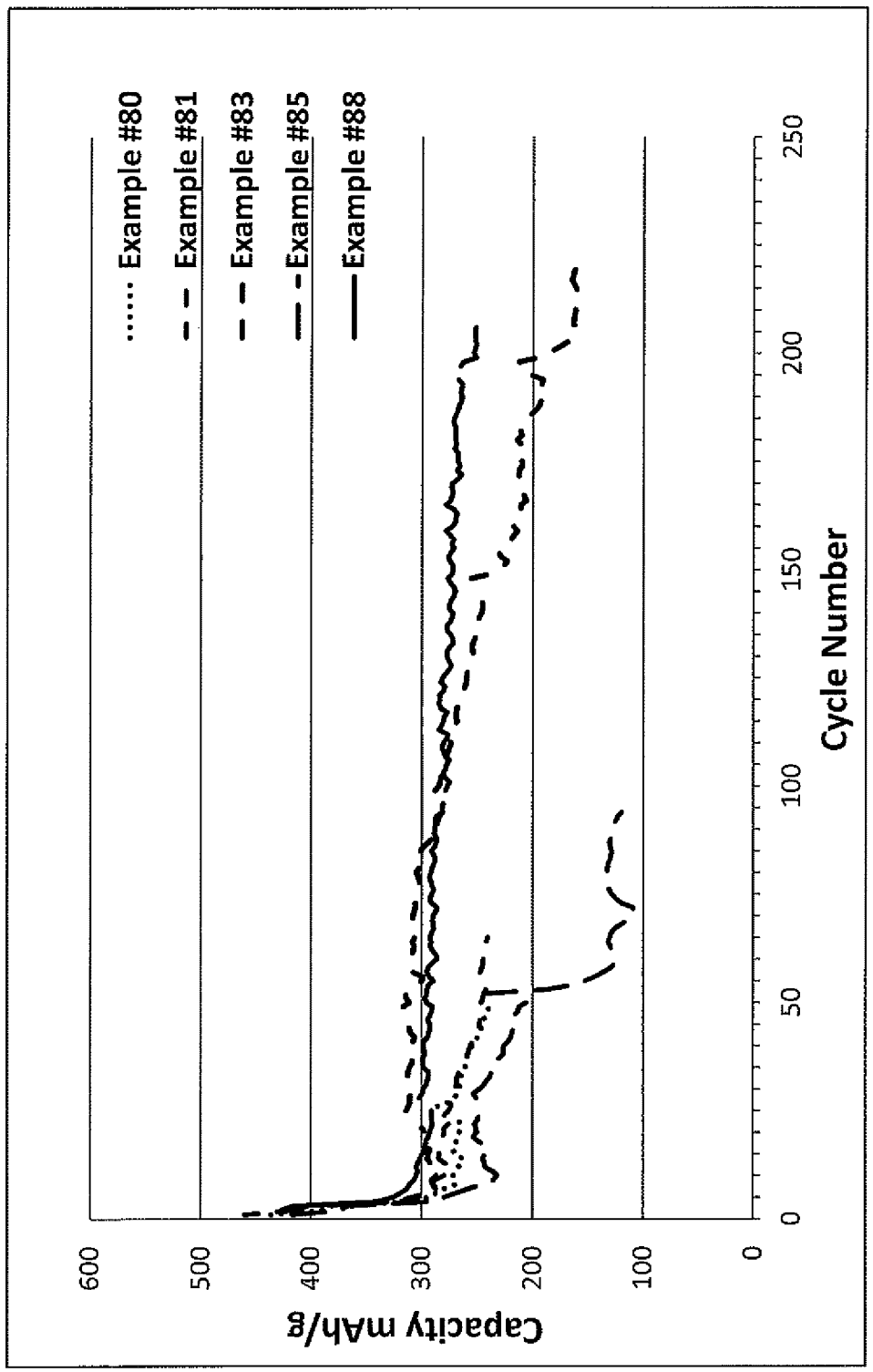
FIG. 16 is graphical representation of the discharge capacity of cycle data of $SiO_x$/Graphite (92/5) anode with Aqu D-5283 and various RDP binders (100/0.66/1.2)

Table 15 & 16 present a detailed description of the different slurry compositions that were prepared. Each slurry composition contained graphite (MAG)/Si oxide($SiO_x$) anode (92/5), carboxymethyl cellulose (Aqu D-5283), and redispersible powder(RDP) binder, (dry ratio was 100/0.67/1.19) in water. The solid content in the slurry was 40-50%. Additionally, as the reference slurry, the composition containing latex, the latex comprised a mixture of Zeon® BM-400 and Zeon® BM-480B latexes in an equal ratio, such that the ratio of dry components, i.e., only the graphite/$SiO_x$, carboxymethyl cellulose, Zeon® BM-400, and Zeon® BM-480B, was 97.5/1/0.75/0.75. The slurry was coated onto the copper foil to prepare the half coin cells and their electro chemistry and cycle performance was evaluated. The data is presented in Table 15 and plots in FIG. 15 & FIG. 16.

TABLE 15

| Components | Weight (g) | Weight % of Total Slurry Composition | Normalized Ratio of Solids |
|---|---|---|---|
| $SiO_x$ anode powder | 0.979 | 2.37 | 100 |
| MAG Graphite anode powder | 18.02 | 43.76 | |
| Aqualon® Aqu D-5283(CMC) | 0.127 | 0.31 | 0.67 |
| RDP, various Dehydro or SB latex | 0.228 | 0.55 | 1.19 |
| Water | 21.825 | 53.0 | |
| Total | 41.179 | 100 | |

TABLE 16

| Examples | Binder Formulation Composition | Electrode Mass (mg) | Discharge Capacity mAh/g | Charge Capacity mAh/g | ICE % |
|---|---|---|---|---|---|
| 79 | Aqu D-5283/Dehydro | 4.9 | 436.1 | 374.9 | 0.86 |
| 80 | 6880 dry (0.667/1.2) | 4.7 | 452.1 | 388.8 | 0.86 |
| 81 | Aqu D-5283/Dehydro | 4.6 | 460.1 | 404.1 | 0.88 |
| 82 | 7660 dry (0.667/1.2) | 3.9 | 478.2 | 414.5 | 0.87 |
| 83 | Aqu D-5283/Dehydro | 5 | 468.3 | 401.8 | 0.86 |
| 84 | 6150 dry (0.667/1.2) | 4.8 | 467.5 | 400.9 | 0.86 |
| 85 | Aqu D-5283/RDP-2 | 7.9 | 353.2 | 273.4 | 0.77 |
| 86 | dry (0.667/1.2) | 7.7 | 400.7 | 334.6 | 0.83 |
| 87 | Aqu D-5283 | 2.9 | 505.3 | 433.6 | 0.86 |
| 88 | SB400B + 480B | 3.1 | 506.5 | 417.5 | 0.82 |
| 89 | (1/1) (0.667/1.2) | 3.9 | 461.9 | 392.1 | 0.85 |

Ingredients listed in Table 15:
(1) MAG: Synthetic graphite, commercially available from Hitachi Chemical Co., Tokyo Japan
(2) $SiO_x$ anode was purchased from OTC, Osaka, Japan
(3) Aqualon® Aqu D-5283: Commercially available carboxymethyl cellulose from Ashland, Inc. (Wilmington, DE) with a degree of substitution from 0.65-0.9 and a Brookfield® viscosity of 4,000-9,000 cps for a 1% solution at 30 rpm with spindle 4.
(4) Dehydro 6880, 7660 & 6150 are redispersible powder purchased from Acquos Pty Ltd, Australia). They are made of styrene-acrylic or vinyl acrylic emulsion latex, anticaking agent and protective colloid with spray drier.
(5) Zeon® BM-480B: Commercially-available styrene butadiene latex from Zeon Corporation, Tokyo, Japan.
(6) Zeon® BM-400: Commercially-available styrene butadiene latex from Zeon Corporation, Tokyo, Japan.
(7) ICE: Initial Coulombic Efficiency

Example A

Preparation of CHMEC

A two-quart stirred autoclave glass bowl was charged with 64.8 g (0.4 moles) cotton linters (dry weight) and 1000 ml t-butyl alcohol (99.5+%). The bowl was then sealed to the reactor and purged of oxygen, evacuating to 26 inches gauge vacuum followed by pressurization to 20 psig with nitrogen. This vacuum-pressurized cycle was repeated 5 times, after which a caustic solution (61.7 g 50% NaOH/73 ml $H_2O$) was added, via a syringe, to the stirred cellulose slurry under vacuum. The reactor was given another five degassing cycles, as above. The alkali cellulose was allowed to stir for 60 minutes at 15°-20° C. under 10 psig nitrogen. A monochloroacetic acid solution (10.4 g MCA/25 ml. tert-butyl alcohol) was then introduced to the slurry, under vacuum, via a syringe. After pressurization to 10 psig $N_2$, the reaction was then heated to 70° C. (approximately 30-minute heatup period) and maintained for 30 minutes. Upon cooling to 40° C. and evacuating to approximate 20 inches vacuum, 79.0 g. ethylene oxide condensed in a Fischer-Porter tube, was added. After pressurization to 10 psig $N_2$, the reaction was held at 45° C. for 60 minutes, then at 80° C. for 120 minutes. Upon cooling to less than 30° C., the reaction mixture was neutralized with 31 ml. HNO$_3$ (70%) and 5 ml. glacial acetic acid. After filtration, the wet cake was batch washed in acetone, then dehydrated with 99.5% acetone and dried. The final product had HEMS: 1.9-2.5, CMDS: 0.3-0.5, and 1% viscosity: 3000 cps Examples 90-93

Table 17 & 18 present a detailed description of the different slurry compositions that were prepared. Each slurry composition containing graphite (MAG)/Si oxide (SiO$_x$) anode (92/5), carboxymethyl hydroxycellulose (CMHEC, prepared in Example A), and redispersible powder(RDP) binder, (dry ratio was 100/1/1.5) in water. The solid content of the slurry was 40-50%. Additionally, as the reference slurry, the composition containing latex, the latex comprised of Zeon® BM-480B latex. The slurry was coated onto the copper foil to prepare the anode electrode. The slurry viscosity and adhesions were measured. The data is presented in Table 18. The electrode from formulation 93 has good adhesion, flexible and good coating appearance.

TABLE 17

| Components | Weight (g) | Weight % of total slurry | Normalized ratio of solids |
| --- | --- | --- | --- |
| SiO$_x$ anode powder | 2.06 | 2.4 | 100 |
| MAG Graphite anode powder | 37.94 | 43.4 | |
| CHMEC (Example A) | 0.4 | 0.5 | 1 |
| RDP | 0.6 | 0.7 | 1.5 |
| Water | 46.5 | 53.1 | |
| Total | 87.5 | 100 | |

TABLE 18

| Examples | Binder formulation composition | viscosity (3 RPM), cps | viscosity (30 RPM), cps | adhesion, gf/mm |
| --- | --- | --- | --- | --- |
| 90 | CMHEC-A*/RDP-1(1/1.5) | 32593 | 8578 | 0.244 |
| 91 | CMHEC-B/RDP-1(1/1.5) | 21595 | 6079 | 0.266 |
| 92 | CMHEC-A/Zeon BM-480B (1/1.5) | 13597 | 4979 | 0.656 |
| 93 | CMHEC-A/Dehydro 7930** (1/1.5) | 26398 | 13077 | 0.723 |

*CMHEC-A & CMHEC-B are carboxymethyl hydroxy cellulose, AQU D-5278, with different MW; 1% viscosity A: 3500 cps, B: 2200 cps.
**Dehydro 7930 is redispersible powder purchased from Acquos Pty Ltd, Australia. It is made of styrene-acrylic emulsion latex, anticaking agent and protective colloid with spray drier.

What is claimed is:

1. A binder precursor composition for use in preparation of a lithium ion battery comprising:
   an ionizable water soluble polymer, wherein the ionizable water soluble polymer comprises carboxymethyl hydroxyethyl cellulose; and
   a redispersible powder comprising a protective colloid, an anticaking agent, and a latex polymer.

2. The binder precursor composition of claim 1, wherein the ionizable water soluble polymer is present in the binder precursor composition in a range of from about 2% to about 75% by weight and the redispersible powder is present in the binder precursor composition in a range of from about 25% to about 98% by weight.

3. The binder precursor composition of claim 1, wherein the protective colloid is present in the redispersible powder in a range of about 0.1% to about 10% by weight.

4. The binder precursor composition of claim 1, wherein the anticaking agent is present in the redispersible powder in a range of about 1% to about 35% by weight.

5. The binder precursor composition of claim 1, wherein the latex polymer is present in the redispersible powder in a range of about 30% to about 98.9% by weight.

6. The binder precursor composition of claim 1, wherein the protective colloid is selected from the group consisting of polyvinyl alcohol, polyvinyl acetate, a hydroxyalkyl cellulose polymer, and combinations thereof.

7. The binder precursor composition of claim 1, wherein the anticaking agent is selected from the group consisting of calcium carbonate, kaolin, silica, carbon, lithium carbonate, and combinations thereof.

8. The binder precursor composition of claim 1, wherein the latex polymer is selected from the group consisting of styrene butadiene, vinyl acetate ethylene, styrene acrylic, vinyl acrylic, ethylene vinylversatate, and combinations thereof.

9. The binder precursor composition of claim 1, wherein the redispersible powder is in the form of particles, and wherein the average diameter of the particles is less than about 500 μm.

10. The binder precursor composition of claim 1 further comprising an electrode active material.

11. The binder precursor composition of claim 10, wherein the ionizable water soluble polymer is present in the binder precursor composition in a range of from about 0.25% to about 2.25% by weight, the redispersible polymer is present in the binder precursor composition in a range of from about 0.25% to about 3.5% by weight, and the electrode active material is present in the binder precursor composition in a range of from about 94.25% to about 99.5% by weight.

12. The binder precursor composition of claim 10, wherein the electrode active material is an anode active material selected from the group consisting of 1) a carbonaceous material, 2) a silicon-based alloy, 3) a complex compound comprising a carbonaceous material and a metal selected from the group consisting of Al, Ag, Bi, In, Ge, Mg, Pb, Si, Sn, Ti, and combinations thereof, 4) a lithium complex metal oxide, 5) a lithium-containing nitride, and (6) combinations thereof.

13. The binder precursor composition of 10, wherein the electrode active material is a cathode active material selected from the group consisting of lithium-containing transition metal oxides.

14. An aqueous slurry composition formed by adding the binder precursor composition of claim 1 to water.

15. The aqueous slurry composition of claim 14, wherein the slurry has a Brookfield viscosity in a range of from about 1,000 cps to about 15,000 cps at a shear rate in a range of from about 10 s$^{-1}$ to about 40 s$^{-1}$ at 25° C.

16. An electrode for a lithium ion battery comprising:
   a film comprising: (1) an electrode active material, and (2) a binder precursor composition of claim 1 comprising an ionizable water soluble polymer, a protective colloid, an anticaking agent, and a latex polymer, wherein the ionizable water soluble polymer comprises carboxymethyl hydroxyethyl cellulose; and
   a current collector.

17. The electrode of claim 16, wherein the ionizable water soluble polymer is present in the film in a range of from about 0.25% to about 2.25% by weight, the protective colloid is present in the film in a range of from about 0.05% to about 0.2% by weight, the anticaking agent is present in the film in a range of from about 0.1% to about 0.5% by weight, the latex polymer is present in the film in a range of from about 0.5% to about 4% by weight, and the electrode active material is present in the film in a range of from about 94.25% to about 99.5% by weight.

18. The electrode of claim 16, wherein the current collector comprises a metal selected from the group consisting of aluminum, copper, and combinations thereof.

19. The electrode of claim 16, wherein a surface of the film is bound to a surface of the current collector forming a bond, wherein the adhesive strength of the bond is at least about 0.3 gf/mm as determined by 90 Degree Peel Adhesion Test.

20. The electrode of claim 16, wherein the capacity retention percentage of the electrode at a C-Rate of 0.5 C and at 25° C. for 50 cycles is greater than about 80%, and wherein the film thickness is in a range of from about 30 to about 100 μm.

21. The electrode of claim 16, wherein the impedance of the electrode is less than about 300 ohm, and wherein the thickness of the film is less than about 70 μm.

* * * * *